(12) United States Patent
Marti Canizares et al.

(10) Patent No.: US 12,330,048 B2
(45) Date of Patent: Jun. 17, 2025

(54) CONTROLLING A USER INTERFACE

(71) Applicant: KING.COM LIMITED, St. Julians (MT)

(72) Inventors: Pol Marti Canizares, Barcelona (ES); Miguel Santirso Gonzalez, Barcelona (ES)

(73) Assignee: KING.COM LIMITED, St. Julian's (MT)

(*) Notice: Subject to any disclaimer, the term of this patent is extended or adjusted under 35 U.S.C. 154(b) by 0 days.

(21) Appl. No.: 18/121,924

(22) Filed: Mar. 15, 2023

(65) Prior Publication Data

US 2023/0211230 A1  Jul. 6, 2023

Related U.S. Application Data

(63) Continuation of application No. 17/038,772, filed on Sep. 30, 2020, now Pat. No. 11,617,944.

(51) Int. Cl.
| | |
|---|---|
| A63F 13/2145 | (2014.01) |
| A63F 13/69 | (2014.01) |
| A63F 13/79 | (2014.01) |
| A63F 13/795 | (2014.01) |
| G06F 3/0481 | (2022.01) |
| G06F 3/04817 | (2022.01) |
| G06F 3/04842 | (2022.01) |
| G06T 11/00 | (2006.01) |
| G06F 3/0488 | (2022.01) |

(52) U.S. Cl.
CPC .......... *A63F 13/2145* (2014.09); *A63F 13/69* (2014.09); *A63F 13/79* (2014.09); *A63F 13/795* (2014.09); *G06F 3/0481* (2013.01); *G06F 3/04817* (2013.01); *G06F 3/04842* (2013.01); *G06T 11/00* (2013.01); *G06F 3/0488* (2013.01); *G06T 2200/24* (2013.01)

(58) Field of Classification Search
CPC ...... A63F 13/2145; A63F 13/69; A63F 13/79; G06F 3/04817; G06F 3/04842
See application file for complete search history.

(56) References Cited

U.S. PATENT DOCUMENTS

| | | |
|---|---|---|
| 2010/0210359 A1 | 8/2010 | Krzeslo et al. |
| 2011/0065511 A1 | 3/2011 | Mahan et al. |
| | (Continued) | |

*Primary Examiner* — James S. McClellan
*Assistant Examiner* — Ross A Williams
(74) *Attorney, Agent, or Firm* — Holzer Patel Drennan

(57) ABSTRACT

A computer device comprising a user interface and a processor. A first tier of a whole rewardable object is rendered, each tier of the rewardable object comprising a set of visual objects, each visual object representing a respective game level having an associated game objective. Each visual object is associated with an object status selected from a completed status and a playable status. A completed status is assigned to the visual object when either the user has attained the associated game objective of the game level, or an indication has been received that the associated game objective of the game level has been attained at a remote user device. When all visual objects of the first tier have been assigned a completion status, it is determined that at least one virtual object of the whole rewardable object is not associated with a completed status and a second tier is rendered.

20 Claims, 14 Drawing Sheets

(56) References Cited

U.S. PATENT DOCUMENTS

| | | | | |
|---|---|---|---|---|
| 2012/0220377 A1* | 8/2012 | Cantor | ............... | A63F 13/795 |
| | | | | 463/42 |
| 2014/0080560 A1* | 3/2014 | Knutsson | ............ | A63F 13/63 |
| | | | | 463/10 |
| 2014/0080600 A1* | 3/2014 | Knutsson | ........... | A63F 13/428 |
| | | | | 463/31 |
| 2014/0080601 A1 | 3/2014 | Knutsson | | |

* cited by examiner

CONTROLLING A USER INTERFACE

CROSS-REFERENCE TO RELATED APPLICATIONS

This is a continuation of U.S. application Ser. No. 17/038,772, filed Sep. 30, 2020, the entire contents of which being fully incorporated herein by reference.

FIELD OF INVENTION

The present invention relates to controlling a user interface responsive to user engagement with displayed elements on the interface of a computer device.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with easy to use game mechanics, but becoming progressively more challenging so that players are not bored, but remain engaged and develop rewarding skills. Effective engagement requires various forms of feedback to reinforce player sense of success and accomplishment.

Engagement can be enhanced by enabling interactions between different players.

A technical challenge is to create a computer device and method which can support continuous user engagement and provide an engaging user experience.

This patent specification describes not only various ideas and functions, but also their creative expression. A portion of the disclosure of this patent document therefore contains material to which a claim for copyright is made and notice is hereby given: CopyrightKing.com Limited 2019 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

The present invention seeks to provide computer devices and methods configured to deliver an engaging user experience by providing a social collaboration feature implemented in such devices and by such methods, in which multiple users work collaboratively and in parallel to achieve a common objective.

According to a first aspect of the present invention, there is provided a computer device comprising: a user interface comprising a display and configured to receive a user input to engage with one or more visual object rendered on the display; one or more processor configured to operate in a social collaboration mode to: render on the display a first tier of a whole rewardable object, the whole rewardable object comprising a plurality of tiers, each tier comprising a set of visual objects, each visual object representing a respective game level having an associated game objective, wherein each visual object is associated with a respective level identifier and at least one of an object status selected from: a completed status which defines that the visual object has been the subject of a successful attempt to attain the game objective of the game level associated with the visual object; and a playable status which defines that the visual object is available for play; detect a user input from a user selecting one of the visual objects which has a playable status and use the level identifier of that visual object to access and render a game environment playable in accordance with the respective game level to attain the associated game objective; assign a completed status to the visual object when the first one of the following conditions has been detected: (a) the user has attained the associated game objective of the game level; and (b) an indication has been received at the user device that the associated game objective of the game level has been attained at a remote user device; detect when all visual objects of the first tier have been assigned a completion status; and, in response; determine that at least one of the virtual objects of the whole rewardable object is not associated with a completed status; and render on the display a second tier of the whole rewardable object, the second tier comprising a set of visual objects having a playable status.

In some embodiments, the computer device may be configured to render the second tier by changing the object status of the set of visual objects of the second tier from a locked status to the playable status, wherein the locked status defines that the visual object is not available for play.

In some embodiments, the computer device may be configured to render the whole rewardable object on the display when each visual object of every tier comprising the whole rewardable object has a completed status.

In some embodiments, the computer device may be configured to render the visual objects with an indication of their associated object status.

In some embodiments, the computer device may be configured to monitor an attempt made by a user to attain the associated game objective during play of the gameboard by the user.

In some embodiments, the computer device may be configured to generate a reward when each visual object of at least one tier of the whole rewardable object has been assigned the completed status.

In some embodiments, the respective game levels may be associated with the visual objects of each tier have a similar degree of difficulty.

In some embodiments, the degree of difficulty of the game levels may be associated with the second tier is different from the degree of difficulty of the game levels associated with the first tier.

In some embodiments, the computer device may be configured to detect an unsuccessful attempt by the user to attain the associated game objective of the game level and prevent the user from accessing further visual objects.

In some embodiments, the computer device may be configured to assign a blocked state to the user prevented from accessing further visual objects.

In some embodiments, an unsuccessful attempt may be an attempt by the user which fails to attain the associated game objective within a predefined associated game constraint.

In some embodiments, the computer device may be configured to detect that one or more release conditions are satisfied and to change a user state associated with the user from the blocked state to a permitted state, in which the user is able access further visual objects to attempt further game levels.

In some embodiments, the one or more release conditions may comprise receipt by the or another user of a release payment.

In some embodiments, the computer device may be configured to render a visual representation of the user with an indication of the user state associated with the user.

In some embodiments, the computer device may be configured to render a visual indication of the blocked state, the visual indication of the blocked state being a selectable object which, when selected, renders a visual representation of the user associated with the blocked state.

In some embodiments, the computer device may be configured to render a visual representation of the user associated with the visual object when it is determined that the user attains the associated game objective of the associated level.

In some embodiments, the game environment may be an online player game.

In some embodiment, the game environment comprises a gameboard having user selectable game elements.

In some embodiments, at least one of the visual objects may be associated with a different game mechanic to the other visual objects.

In some embodiments, the computer device may be configured to determine, in response to detecting that all visual objects of the first tier have been assigned a complete status, that there is a next tier of the whole rewardable object.

According to a second aspect of the present invention, there is provided a computer device connectable via a computer network to each of first and second user devices, each user device having a user interface comprising a display and configured to receive a user input to engage with one or more visual objects rendered on the display, the computer device comprising one or more processors configured to operate in a social collaboration mode to: generate for display at each of the first and second user devices a first tier of a whole rewardable object, the first tier comprising a set of visual objects, each visual object representing a respective game level of a set of game levels and having a respective level identifier and selectable by a user to access a gameboard having user selectable game elements playable in accordance with the respective game level to attain a respective game objective; receive play data from the first and second devices, the play data comprising a completion indication of the game level when a successful attempt has been made at the first user device to attain the game objective of the respective game level of the selected visual object; transmit the completion indication to the second user device to cause the second user device to change a status of the selected visual object displayed at the second user device from a playable status to a completed status; determine when all the visual objects of the first tier have a completed status; and generate a message for transmission to the first and second devices to cause a next tier of the whole rewardable object to be rendered at each of the first and second devices, the next tier comprising a next set visual objects having a playable status.

In some embodiments, the computer device may be configured to generate a respective reward for transmission to each of the first and second devices when each visual object of at least one tier of the whole rewardable object have been assigned the completed status.

In some embodiments, the computer device may be configured to monitor tiers of a second whole rewardable object generated for display at each of third and fourth user devices, wherein the status of the visual objects of each of the whole rewardable object and the second whole rewardable object are compared to determine which whole rewardable object was first completed.

According to a third aspect of the present invention, there is provided a method of controlling a computer device in a social collaboration mode comprising: rendering on a display of the computer device a first tier of a whole rewardable object, the whole rewardable object comprising a plurality of tiers, each tier comprising a set of visual objects, each visual object representing a respective game level having an associated game objective, wherein each visual object is associated with a respective level identifier and at least one of an object status selected from: a completed status which defines that the visual object has been the subject of a successful attempt to attain the game objective of the game level associated with the visual object; and a playable status which defines that the visual object is available for play; detecting a user input from a user selecting one of the visual objects which has a playable status and using the level identifier of that visual object to access and render a game environment in accordance with the respective game level to attain the associated game objective; assigning a completed status to the visual object when the first one of the following conditions has been detected: (a) the user has attained the associated game objective of the game level; and (b) an indication has been received at the user device that the associated game objective of the game level has been attained at a remote user device; detecting when all visual objects of the first tier have been assigned a completion status; and, in response; determining that at least one of the virtual objects of the whole rewardable object is not associated with a completed status and; rendering on the display a second tier of the whole rewardable object, the second tier comprising a set of visual objects having a playable status.

In some embodiments, the method may further comprise rendering the second tier by changing the object status of the set of visual objects of the second tier from a locked status to the playable status, wherein the locked status defines that the visual object is not available for play.

In some embodiments, the method may further comprise rendering the whole rewardable object on the display when each visual object of every tier comprising the whole rewardable object has a completed status.

In some embodiments, the method may further comprise rendering the visual objects with an indication of their associated object status.

In some embodiments, the method may further comprise monitoring an attempt made by a user to attain the associated game objective during play of the gameboard by the user.

In some embodiments, the method may further comprise generating a reward when each visual object of at least one tier of the whole rewardable object has been assigned the completed status.

In some embodiments, the respective game levels may be associated with the visual objects of each tier have a similar degree of difficulty.

In some embodiments, the degree of difficulty of the game levels may be associated with the second tier is different from the degree of difficulty of the game levels associated with the first tier.

In some embodiments, the method may further comprise detecting an unsuccessful attempt by the user to attain the associated game objective of the game level and preventing the user from accessing further visual objects.

In some embodiments, the method may further comprise assigning a blocked state to the user prevented from accessing further visual objects.

In some embodiments, an unsuccessful attempt may be an attempt by the user which fails to attain the associated game objective within a predefined associated game constraint.

In some embodiments, the method may further comprise detecting that one or more release conditions are satisfied and changing a user state associated with the user from the blocked state to a permitted state, in which the user is able to access further visual objects to attempt further game levels.

In some embodiments, the one or more release conditions may comprise receipt by the or another user of a release payment.

In some embodiments, the method may further comprise rendering a visual representation of the user with an indication of the user state associated with the user.

In some embodiments, the method may further comprise rendering a visual indication of the blocked state, the visual indication of the blocked state being a selectable object which, when selected, renders a visual representation of the user associated with the blocked state.

In some embodiments, the method may further comprise rendering a visual representation of the user associated with the visual object when it is determined that the user attains the associated game objective of the associated level.

In some embodiments, the game environment may comprise a gameboard having user selectable game elements.

In some embodiments, the method may further comprise determining, in response to detecting that all visual objects of the first tier have been assigned a complete status, that there is a next tier of the whole rewardable object.

According to a fourth aspect of the present invention, there is provided a method of controlling each of first and second user devices in a social collaboration mode, each user device having a user interface comprising a display and configured to receive a user input to engage with one or more visual objects rendered on the display, the method comprising: generating for display at each of the first and second user devices a first tier of a whole rewardable object, the first tier comprising a set of visual objects, each visual object representing a respective game level of a set of game levels and having a respective level identifier and selectable by a user to access a gameboard having user selectable game elements playable in accordance with the respective game level to attain a respective game objective; receiving play data from the first and second devices, the play data comprising a completion indication of the game level when a successful attempt has been made at the first user device to attain the game objective of the respective game level of the selected visual object; transmitting the completion indication to the second user device to cause the second user device to change a status of the selected visual object displayed at the second user device from a playable status to a completed status; determining when all the visual objects of the first tier have a completed status; and generating a message for transmission to the first and second devices to cause a next tier of the whole rewardable object to be rendered at each of the first and second devices, the next tier comprising a next set visual objects having a playable status.

In some embodiments, the method may further comprise generating a respective reward for transmission to each of the first and second devices when each visual object of at least one tier of the whole rewardable object have been assigned the completed status.

In some embodiments, the method may further comprise monitoring tiers of a second whole rewardable object generated for display at each of third and fourth user devices, wherein the status of the visual objects of each of the whole rewardable object and the second whole rewardable object are compared to determine which whole rewardable object was first completed.

According to a fifth aspect of the present invention, there is provided a computer device comprising: a user interface comprising a display and configured to receive a user input to engage with one or more visual object rendered on the display; one or more processor configured to operate in a social collaboration mode to: render on the display a tier of a whole rewardable object, the tier comprising a set of visual objects, each visual object representing a respective game level having an associated game objective, wherein each visual object has a respective level identifier and is rendered with an indication of status selected from: a completed status which indicates that the visual object has been the subject of a successful attempt to attain the game objective of the game level associated with the visual object; and a playable status which indicates that the visual object is available for play; detect a user input from a user selecting one of the visual objects which has a playable status and use the level identifier of that visual object to access and render a gameboard having user selectable game elements playable in accordance with the respective game level to attain the game objective; assign a completed state to the visual object when the first one of the following conditions has been detected: (a) the user has attained the game objective of the game level; and (b) an indication has been received at the user device that the game objective of the game level has been completed at a remote user device; detect when all visual objects of the tier have been assigned a completion status; and render on the display a next tier of the whole rewardable object, the next tier comprising a next set of visual objects having a playable status.

BRIEF DESCRIPTION OF THE FIGURES

For a better understanding of some embodiments and to show how the same may be carried into effect, reference will now be made by way of example only to the accompanying drawings, in which.

DETAILED DESCRIPTION

Figure 13:
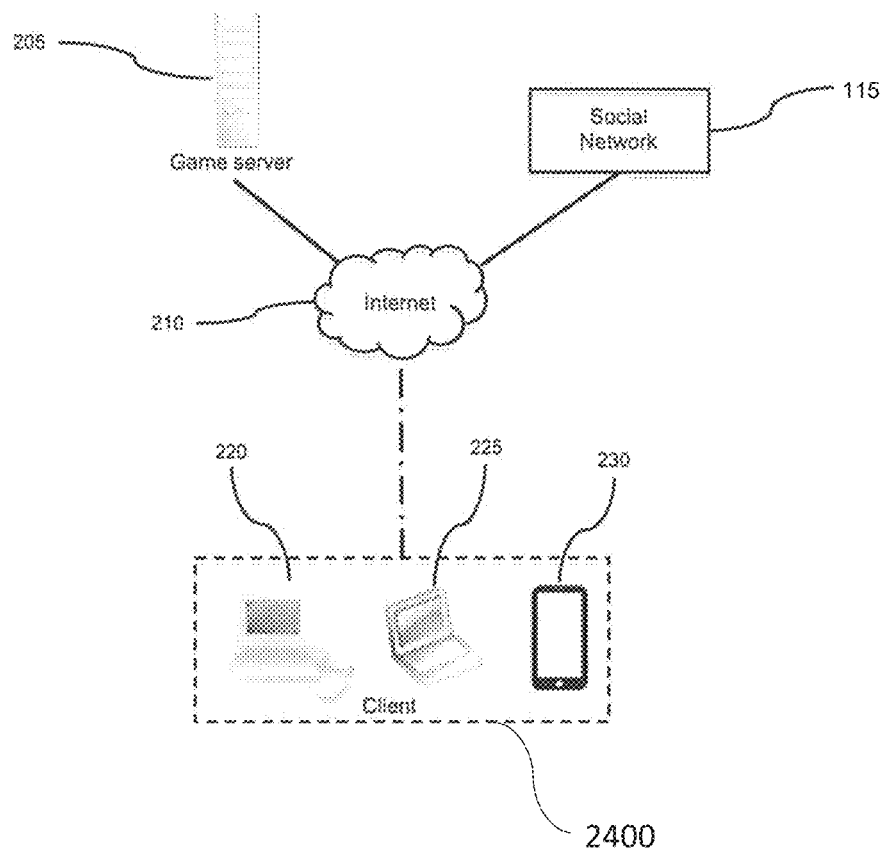
FIG. 13 is a schematic block diagram illustrating an environment for playing a game.

An exemplary overall computer implemented environment in which a social collaboration feature according to embodiments of the present invention can be implemented is shown in FIG. 13. Computer code for delivering a game to be played by a user is stored on for instance on a game server 205. The game is to be played on a client device 240, such as a computer 220, 225 or a smartphone or other handheld device 230. The client device 240 can also be a kiosk, arcade gaming station, smart TV or other device with computing capabilities, input devices and a display that can present the game to a user. The client device 240 communicates with the game server 205 for instance through the Internet 210 or other communication network. The client device 240 may also communicate with a social network server 215 via the network. It should be understood that the social network server 215 and the game server 205 do not have to be located in different places, they could be on the same server or on a plurality of servers located in different locations. People skilled in the art will understand that other devices than the exemplary ones listed can also be used without departing from the spirit and scope of the invention.

In some embodiments, more than one user device 240 communicates with the game server 205 to participate in a social collaboration mode game feature. A user device 240 can synchronise with the game server 205 and the other user devices 240 in communication with the game server 205 which are participating in the social collaboration mode game feature, such that the information associated with the game feature is common to all of the participating user devices 240 and the game server 205.

In the social collaboration mode game feature described herein, a group of users, or a 'team', is provided with a common objective of completing a pre-defined set of levels. The levels of the pre-defined set of levels are divided into groups. The groups are sometimes referred to herein as tiers. The team can only access the levels of a single group at any one time. Once they have completed all level in a group, they can progress onto the next group of levels. The users can play any of the levels in the playable group which have not yet been completed by any team member, with different levels in the group being playable by different users simultaneously. Once a level has been completed by one user in the team, it has been mutually completed for the entire team. The levels are playable in a game environment which in some embodiments comprises a gameboard with user selectable game elements. The game environment may be played in accordance with different game mechanics. The game mechanic may be any known game mechanic. In the context of gameboards, the game mechanic may be a game such as a 'clicker', 'switcher', 'bubble shooter' or 'linker', where the user can cause game elements of a matching or sequential type to be removed from the board by strategic selection. The game environment may be a multiplayer virtual world, in which player avatars are controlled by players. It will be appreciated that any other game mechanic could be used in the context of the collaborative game mode described herein. In some embodiments, different game mechanics may be associated with different levels within each tier or across different tiers.

A 'clicker game' is a type of casual puzzle game where the player is required to find patterns on a seemingly chaotic board. The player then has to match two or more of the same type of game element on the game board and those matched elements will then be removed from the board. The player matches adjacent game elements of the same type by selecting one or more of the game elements in the group of matching elements.

A 'switcher game' is also a type of casual puzzle game where the player is required to find patterns on a seemingly chaotic board. In a switcher game, the player switches the locations of two adjacent game elements on the game board so that one or both of them create a chain of at least three adjacent game elements of the same type. Those matched game elements will then be removed from the gameboard. The gameboard is then repopulated with game objects.

A 'bubble shooter game' is also a type of casual puzzle game where the player is required to find patterns on a seemingly chaotic board. The game provides a static bubble graph in the game board on a display of a computer device. The game objective is to remove bubbles to clear the way through the graph, and to do this the player operates a player object launcher that can shoot player objects into the game board. When the launched player object reaches an object in the player graph, it "sticks" to it. If it hits a game object of the same type as the player object, which already has another game object of the same characteristic adjacent to it, a 3-match condition is created and the three game objects disappear from the game board. A match could have more than three game objects in it. A match can be associated with a certain score.

Another known type of game is "linker game", where a sequence of game elements are linked to form a known sequence, such as a word, which can be matched to a dictionary. When a known sequence is linked, game elements in the link are removed from the gameboard.

The pre-defined set of levels are rendered to the users on a display of a user device. It will be appreciated that each user in the team operates his own user device, however the progress in the pre-defined set of levels may be synchronised for all team members such that the pre-defined set of levels are rendered in the same or similar manner for each user in the team.

Each of the user devices is in communication with a server, which manages information derived from play data from the user devices relating to the pre-defined set of levels and the common objective. In some embodiments, a copy of the information is stored locally on a memory of the user device, the information being updated when the user accesses the social collaboration mode in an online mode, that is when the user device is in contact with the server. This allows the user to access and play the social collaboration mode when in either an online or offline mode. In other embodiments, the user device does not store any game information locally, such that the user device must be connected to the network for the user to access and play in the social collaboration mode.

The terms user and player are used interchangeably throughout this document and no specific meaning is intended using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing form the scope of the present invention.

The techniques described herein can be deployed in many different gameplay architectures. For example, a game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

Another possible infrastructure is a hybrid one, in which back-end servers handle some elements of the gameplay, and for instance a Java game applet is provided to client devices and it is the locally running Java applet that generates the graphics/sounds/user interaction for gameplay on a player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Figure 1:
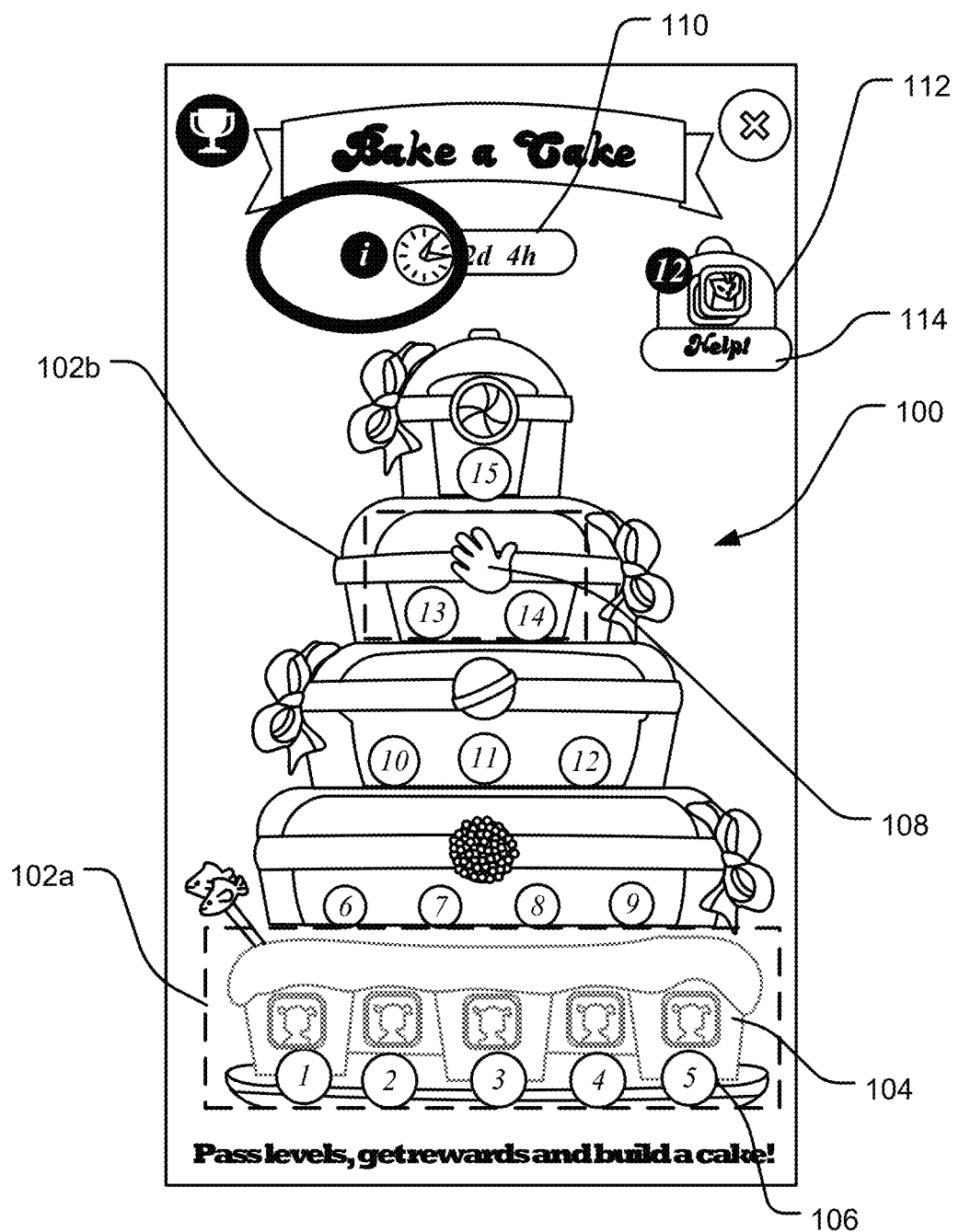
FIG. 1 is an example progress view of a collaborative game mode.

FIG. 1 shows an example display of a user interface, referred to herein as a progress view, rendered to a user on his user device displaying the pre-defined set of levels. In this example, the pre-defined set of levels are displayed as tiers of a cake 100. Each level of the pre-defined set is rendered as a visual object representing a slice 104 of the cake 100. The slices 104 may thus be referred to herein as visual objects. An objective for the team is to 'bake' the cake, and receive a reward. The cake 100 is referred to as a whole rewardable object. It will be appreciated that the whole rewardable object may be visualised as an object other than a cake.

The cake is shown to comprise multiple tiers or layers 102a, 102b, each layer 102a, 102b comprising one or more slices 104. The layers 102a, 102b correspond to the groups of levels which are playable at any one time. Each slice 104 is associated with a corresponding number acting as a visual identifier 106. A further non-visual identifier may be associated with each slice 104. The visual and/or non visual identifiers may act as level identifiers, for example as described with reference to FIG. 7. They may be the same or different.

A first layer of the cake 100, located at the bottom of the cake 100, is shown to be exposed (unwrapped). This first layer has a playable status—each level is playable by the team. The other layers have a locked status, which is visualised by way of a covering or wrapping. The slices 104 in the locked layers 102b are rendered a different colour to those which are playable. The skilled person will appreciate that playable and locked layers 102a, 102b may be rendered distinguishable to the users in other ways, such as by shading, highlighting, outlining etc. The slices 104 associated with the locked layers 102b may be unselectable by the users.

The user selects one of visual objects represented by the slices 104 corresponding to the playable levels of the first layer, which is a playable layer 102a. By selecting a slice 104, the user enters a gameplay mode. In the gameplay mode, a gameboard is rendered to the user on his user device. Gameplay and gameboards are discussed in more detail below.

The levels in the playable layer need not be attempted or completed in any specific order. They users may select any of the playable levels to attempt. In other embodiments, the levels are required to be completed in a predefined order by the team.

Multiple users may play any of the playable levels at the same time. For example, a first user in the team may play the playable level associated with slice 3 at the same time as a second user of the team may play the playable level associated with slice 5.

In some embodiments, two or more users in the team may play the same playable level at the same time.

Figure 3:
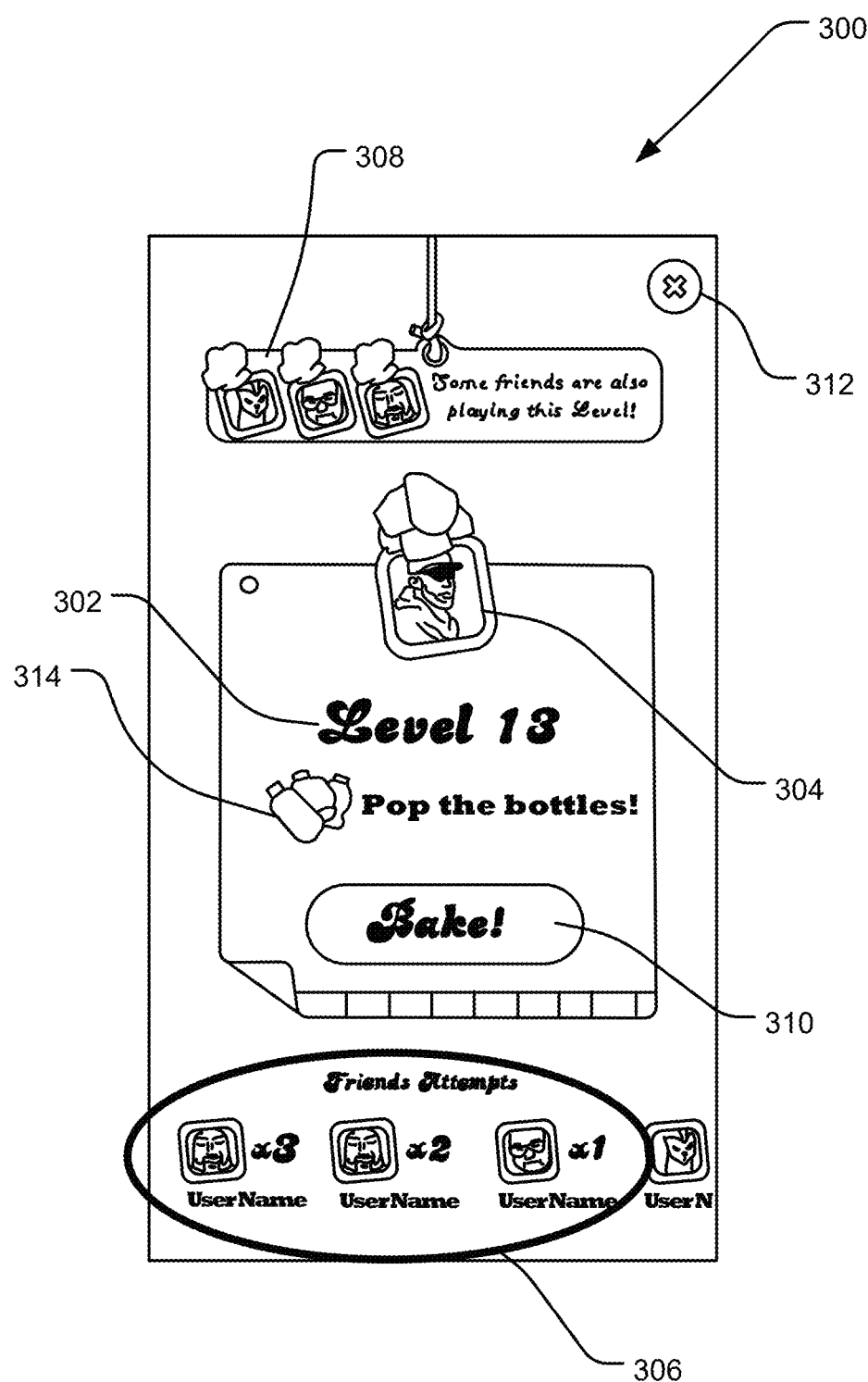
FIG. 3 is an example pre-level display.

When a user selects the visible object associated with a slice 104, a pre-level display 300 is rendered to the user (see FIG. 3). The pre-level display 300 provides a level indication 302, indicating to the user which level he is requesting to attempt. A game objective (or goal) 314 associated with the level may also be rendered to the user. A user indicator 304 associated with the user may be rendered. The user indicator 304 may be a profile picture or an avatar of the user, a coloured token associated with the user, or some other visual indicator.

Other users in the team currently attempting the level are shown to the user in a current attempters section 308. The users who have attempted the level are displayed in a failed attempters section 306. An indication of the number of attempts each user has had is indicated next to an indication of the user in the failed attempts section 306. In some embodiments a number of current attempters and/or total number of team failed attempters may be rendered to the user instead of or as well as indications of the users in the current attempters section 308 and the failed attempters section 306.

In some embodiments, the game mechanic of the level may be identified to the user in the pre-level display 300, for example if different levels in the game mode have different game mechanics.

The information rendered to the user on the pre-level display 300 allows the user to decide whether or not to attempt the level.

If the user decides he still wishes to attempt the level, he selects the play button 310. A gameboard corresponding to the level is then rendered to the user. If the user decides not to attempt the level, he can select an exit button 312 which returns him to the progress view.

Figure 4:
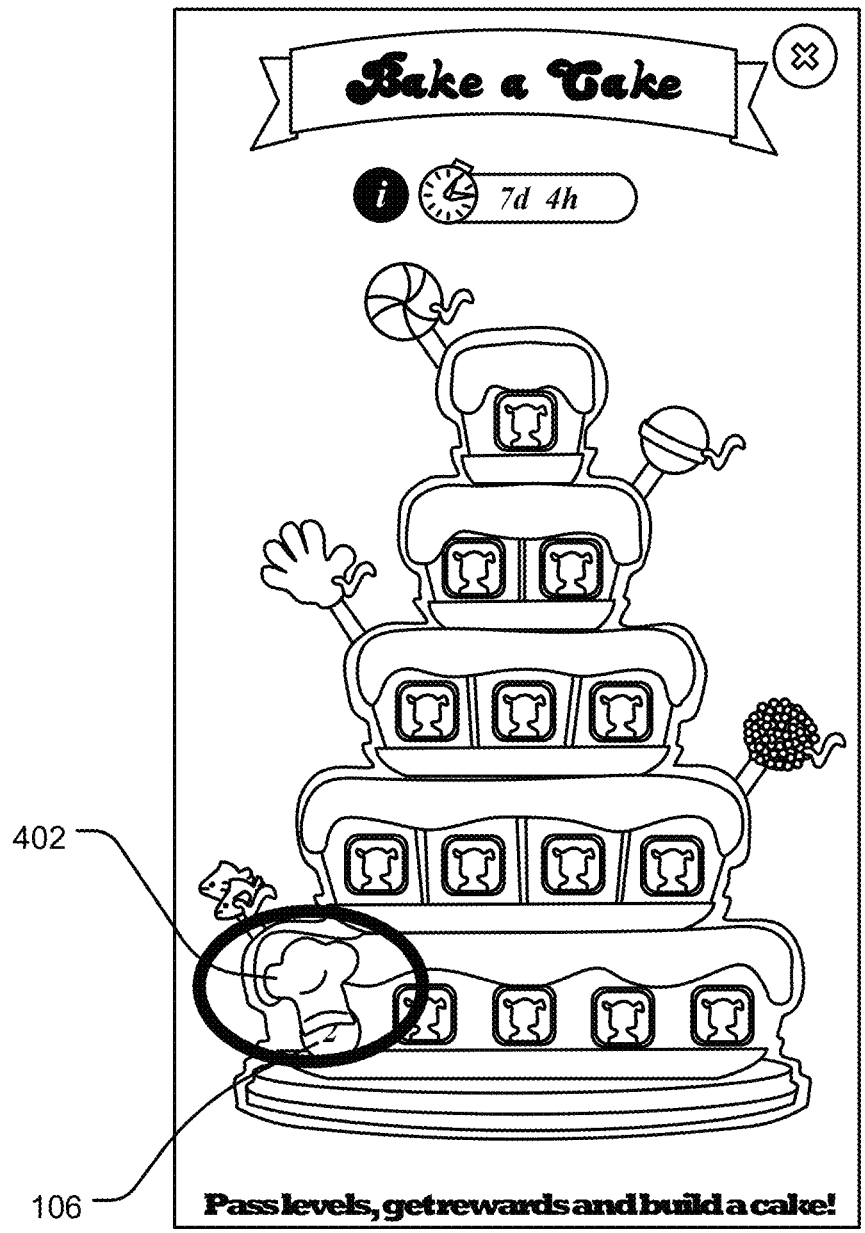
FIG. 4 shows the progress view while a level is being attempted by a team member.

When a playable level is being played by a user of the team, an indication of this may be rendered to the other users of the team. For example, the slice 104 associated with the level currently being played may be displayed in a different colour, it may be highlighted or otherwise shaded in some way. An indicator of the user attempting the playable level may be rendered to the other users on the associated slice 104. An example indication is shown in FIG. 4, in which a chef's hat 402 is displayed over the level number 106. Other indications representing the user may be provided as an alternative, as described above. By indicating that a level is being played, the team may be able to complete the common objective more efficiently as other users can choose to play a different level simultaneously in an attempt to complete more levels in a given time.

Figure 2:
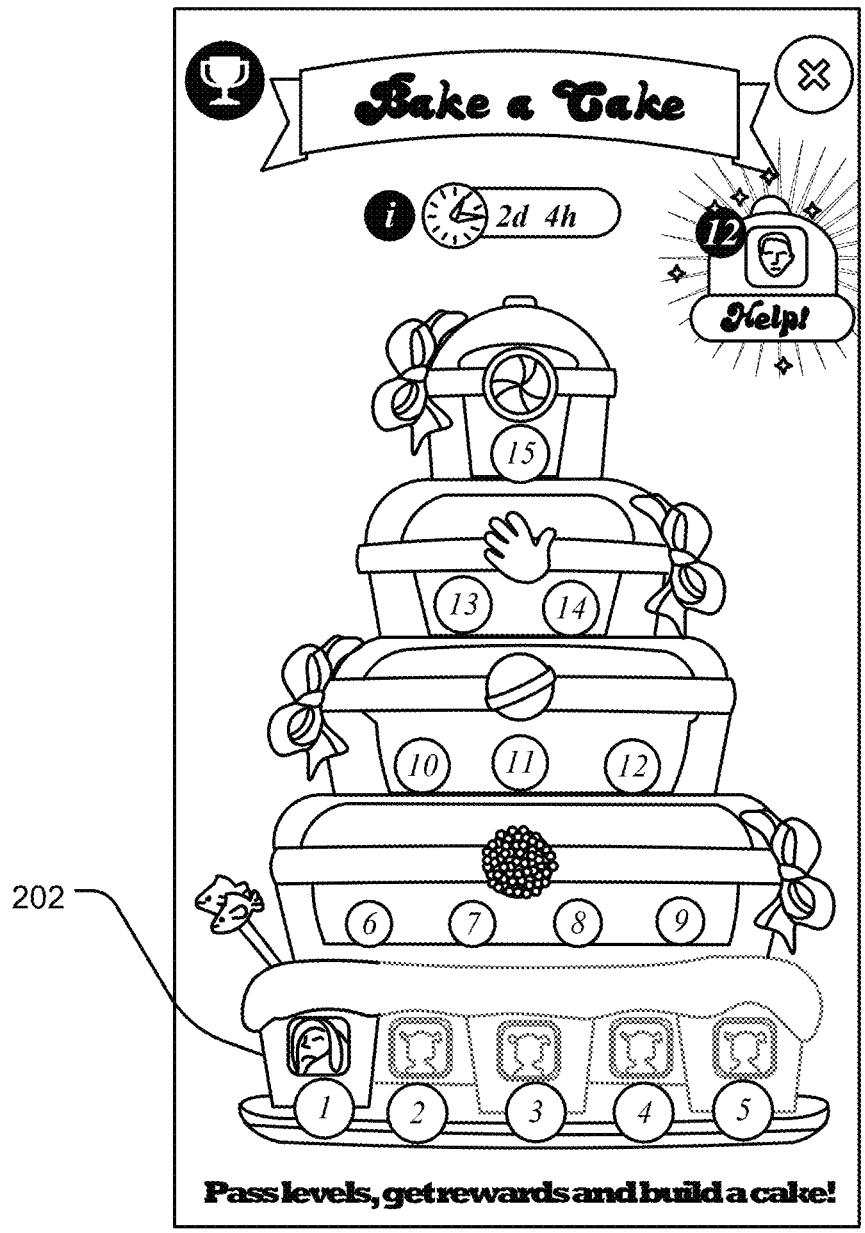
FIG. 2 shows the progress view after a level has been completed.

If the user completes the level, the user returns to the progress view. The progress view is updated to show that the user has completed the level. An example updated progress view is shown in FIG. 2, in which a user has completed the level associated with the slice 1 of the cake 100.

If a user completes a level while in an offline mode, the slice 104 associated with the completed level is rendered as a completed slice 202 for said user only, until he synchronises his game mode with those of the other users in an online mode. That is, when he connects with the server, his play data is uploaded and can be made available to other user devices similarly connected. When the user's game modes synchronise, the levels completed in the offline mode are rendered completed for all users.

Slice 1 is rendered as a completed slice 202 in the progress view. The completed slice 202 is rendered as such to the users in the team, for example by covering with visual indications such as icing and decorations, as shown in FIG. 2. Some other visual indication may be provided, for example a tick may be rendered over or next to the completed slice 202. An indicator of the user who completed the level, here an image of the user, is also rendered on the completed slice 202.

In some embodiments, once a level is completed, users are no longer able to start playing the level. Visual objects associated with completed slices 202 are not selectable by users. This aids the team to complete the common objective more efficiently as users do not waste time playing levels which have already been completed and so do not contribute to completing the common objective. However, in other embodiments a completed level may be played by users.

The progress view is updated for all users of the team to show the team's progress. If the user is not online at the time at which a level is completed, their progress view is updated the next time the user is online.

In a scenario in which multiple users are attempting the same level at the same time, the associated slice becomes a completed slice 202 when the level is first completed by any of the multiple users. However, any users who started playing the level before it was completed can continue to play the level. The indicator displayed on the completed slice 202 is that associated with the first user to complete the level. In some embodiments, if one or more users subsequently complete the level, their indicators may also be rendered visible on the completed slice 202. In some embodiments, if a user has completed a level, his indicator will be rendered on top of the indicators of any other users on the associated completed slice 202 on his device.

In order to unlock a locked layer 102b, the team must complete all of the levels associated with the currently playable layer 102a. The layers 102a, 102b are unlocked sequentially, such that once the team have completed all levels of the first layer of the cake 100, the second layer of the cake 100 is unlocked such that the second layer becomes the playable layer 102a. The team, therefore, works their way up the cake 100 until it is complete.

Figure 5:
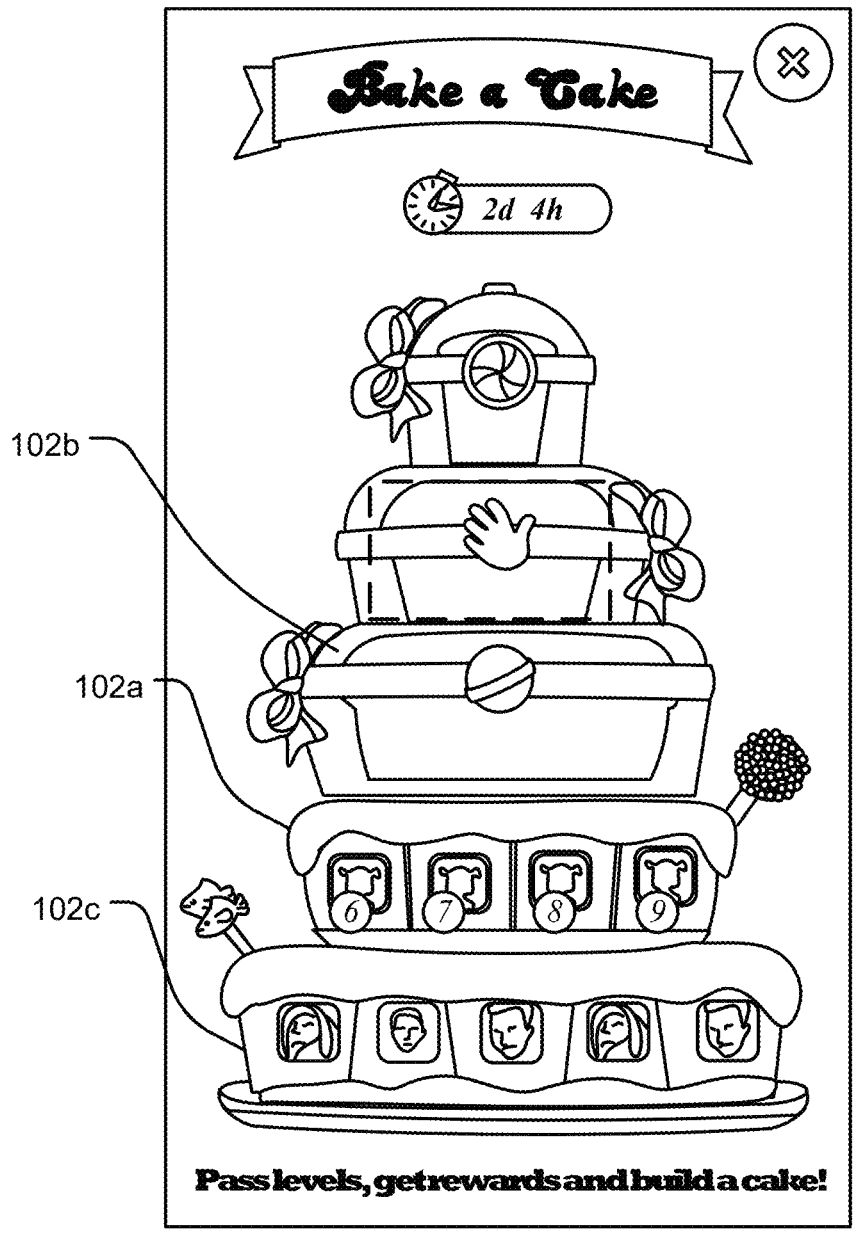
FIG. 5 shows the progress view after a first set of levels has been completed.

FIG. 5 shows the progression view after the first layer has been completed. The second layer is now the playable layer 102a. Third, fourth, and fifth layers of the cake 100 remain locked layers 102b. The first layer is now a completed layer 102c. The levels of the completed layer 102c are locked such that users cannot select or play completed levels. The first layer is visually indicated as being complete by way of all of the slices 104 being covered in icing, that is, rendered a different colour, and each of the slices 104 has a visual indicator of the user who completed the associated level. It will be appreciated that different visualisations may be presented.

In some embodiments, only playable layers 102a are rendered visible to the users. In other embodiments, only playable layers 102a and completed layers, that is layers for which all associated levels have been completed, are rendered. In some embodiments, locked layers 102b are not rendered to the user. When it is determined that all slices of a layer are completed, the next layer is unlocked and rendered on the display.

Once every level of the cake 100 has been completed, the whole cake 100 is rendered in a completed state. Alternatively, the whole cake 100 may not be rendered. Some other indication that the common objective of completing all of the levels of the cake 100 may be rendered to the users, for an example a completion message or banner.

Each of the layers 102a, 102b is associated with a reward 108. The reward 108 may be rendered to the user associated with its layer 102a, 102b. For example, in FIG. 1, the reward 108 associated with the fourth layer is a hand booster, the booster being rendered visible to the user on the covering of the layer. The reward 108 may be rendered in other locations, such as next to the layer 102a, 102b it is associated with or the rewards 108 may be shown in a stack, with their order in the stack corresponding to the order of the layers 102a, 102b with which they are associated.

The reward 108 may be any type of booster, a collection of boosters, or other in-game item or currency. Other types of reward may include additional time or lives in which to complete the common objective, or releasing blocked users, as discussed below. It will be appreciated that other rewards may be provide for layer completion.

When the team completes a layer 102a, 102b each of the users in the team is provided with the reward 108 associated with the completed layer. If a user is offline when a layer is completed, the user receives the reward when he next goes online.

In some embodiments, individual levels are associated with rewards. These rewards may be provided to all members of the team when the level is completed. In some embodiments, level rewards are only provided to the user who completes the level, thus providing a personal incentive to the users.

By providing each user of the team with the reward upon layer or level completion, the team is more inclined to work collaboratively, and user engagement is increased.

The team are required to complete the common objective within a predefined time period. The time remaining for completion may be rendered in a countdown 110 on the progress view. In some embodiments, the time played may be provided in a clock which counts up to a predefined time. The predefined time period may be rendered to the users. In some embodiments, other constraints are defined in which the team is required to complete the common objective. For example, the team may have a predefined combined number of lives which they can use to complete the common objective.

Each layer 102a, 102b of the cake 100 may have an associated level of difficulty. For example, the first layer of the cake 100 may comprise levels which are considered easier for the users to complete than those comprising the second layer, and so on.

Each successive layer 102a, 102b of the cake 100 may comprise fewer levels than the layer 102a, 102b preceding it. When combined with increased difficulty, the layers 102a, 102b be may defined such that each layer 102a, 102b is intended to take the same amount of time to complete, or each successive layer is intended to take more time to complete than the preceding layer.

In some embodiments, the team is provided with an additional reward upon completing the common objective of completing all levels of the whole rewardable object. For example, each user of the team may be provided with a reward to use in other gameplay modes.

A user may only play levels when he is in a permitted state. The permitted state may be visualised by providing an indication of the user, such as a picture or avatar of the user, with a chef's hat, or some other visual permitted state indication such as highlighting. The indication of the permitted state may additionally or alternatively be provided to the user such that he knows whether or not he is in a permitted state.

The user loses his chef's hat, i.e. enters a blocked state in which the user cannot play levels, if he fails a predefined number of attempts. In some embodiments, the user loses his chef's hat every time he loses a level. That is, the chef's hat is associated with a single attempt. It will be appreciated that the chef's hat may be associated with any predefined number of attempts, such that when a user fails to complete levels a number of times equal to the predefined number, he also loses his chef's hat.

In some embodiments, the blocked state is associated with a predefined number of attempts of each currently playable level. For example, the user may be able to attempt each playable level three times before entering the blocked state. In such an embodiment, the user may not be able to attempt any level he has failed the predefined number of time (here, three times) but may still be able to attempt other levels.

In some embodiments, the number of attempts associated with the blocked status may also correspond to a time period. For example, the user may be able have three attempts per day before entering the blocked status, with the number of attempts resetting at a predefined time each day.

Users in a blocked state are visualised on the progress view in a holder 112. The number of users in the holder 112, i.e. the number of users in the team who are in a blocked state, is indicated next to the holder 112. By visualising to the users which users and/or how many users are in a blocked state, the users can more effectively determine whether to release the blocked users.

A user may release all of the blocked users from the holder 112 such that they return to the permitted state and regain their chef's hat. If a user wishes to release the blocked users, he selects a release button 114, which is shown adjacent the holder 112 in FIG. 1. In some embodiments, only users in the permitted state are able to release the blocked user. In other embodiments, any user in the team can release the blocked users.

The user selecting the release button 112 in order to release the blocked users may be required to perform a task or be involved in a trade in order to release the blocked users. For example, the user may be required to provide a payment, one or more of the completed slices 202 may be rendered not completed, or the remaining time to complete the common objective may be reduced. The amounts exchanged for the release of the blocked users may be proportional to the number of blocked users to be released, or it may be a fixed amount irrespective of the number of blocked users. In some embodiments, the user releasing the blocked users may be able to select which of the blocked users to release.

Alternatively or additionally, the blocked users may be released from the holder 112 when a layer 102a, 102b is completed.

When a user releases the blocked users from the holder 112, he has the option of sending a message to the released users via a messaging functionality. The messaging functionality may also be used by the users of the team in other scenarios. For example, the user may be able to communicate vie the messaging functionality at any time. The users may use the messaging functionality to, for example, discuss team tactics.

An indication that the user has been released from the blocked state may be automatically transmitted by the server to the user devices associated with the released users and rendered to the users. This indication may be a message sent via the messaging functionality and/or displayed as some visual indication rendered to the user in the progress view, such as the chef's hat 402 being rendered to the user or associated with a visual indication of the user on the progress view.

In some embodiments, an indication of the user who released the blocked users may be automatically transmitted by the server to the user devices associated with the released users. This indication may be a message transmitted via the messaging functionality and/or displayed as some visual indication. This indication may be rendered to the user at the same time as the indication that the user has been released is displayed to him.

As described above, the team attempts to complete the common objective, i.e. complete all levels of the cake 100, within the predefined constraint such as the predefined time. Once the constraint expires, for example the predefined time period ends, the team can no longer attempt levels of the cake 100. If all levels of the cake 100 have not been completed by the expiry of the constraint, the team has failed to complete the common objective. The users are no longer able to attempt the levels of the cake 100.

In some embodiments, users are able to leave a team before the common objective has been completed or before the constraint has expired. In such an event, the levels completed by the user who has left remain completed for the team.

In some embodiments, two or more teams compete against each other to achieve their common objective. Each team may be able to view the progress of the other team, however the users of one team can only contribute to the progress of their own team.

To join a team, a user may send a request to join a team. Once there are enough users requesting to join a team, the users are sent a joining invitation which is used to join the team. Alternatively, users may be sent a joining invitation without first requesting one. The users can then decide whether or not to join a team. The team members may be randomly assigned to teams.

Alternatively, teams may be assigned based on user parameters. For example, teams may be assigned such that the users in the team are all of a similar skill level, so that all users can equally contribute to the common objective. The skill level of a user may be determined from a score or current playing level of a user outside of the social collaboration mode described herein. Teams may be assigned based on user location, such that users are in the same time zone allowing for better team communication, or in different time zones such that the team can contribute to the common objective constantly.

Alternatively, teams may be assigned within friendship groups. For example, teams may be defined based on a user's friends on a social media platform.

In some embodiments, a group of users can decide to form a team. In such an embodiment, a user may request a team invitation which can be shared with all users of the group. Only users with access to the invitation can join the team.

Figure 8:
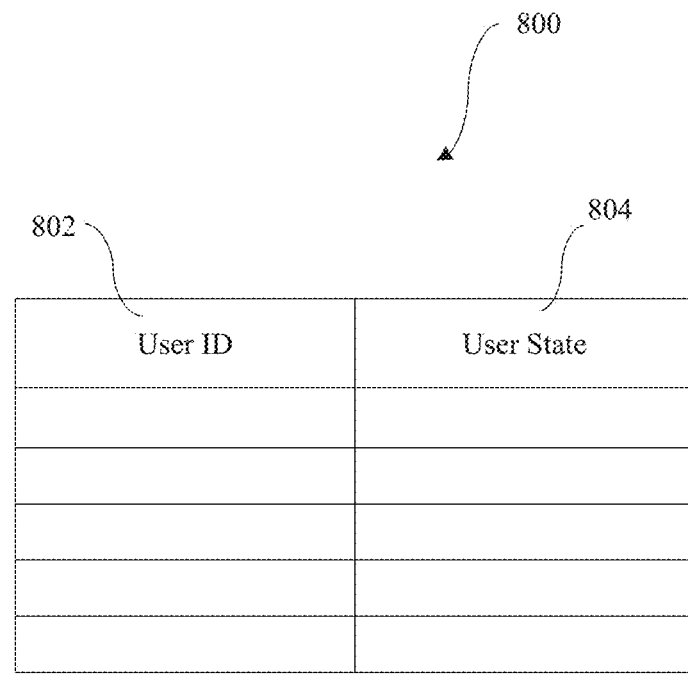
FIG. 8 is a schematic diagram of a team database.

FIG. 8 shows a team database 800 for storing information about the user in the team. The team database comprises two fields: a user ID field 802 and a user state field 804.

Each user in the team is associated with a user ID 802. The user ID 802 may be assigned to a user when the team is created, such that it is uniquely assigned for the specific cake 100. Alternatively, the user ID 802 may be a unique ID of the user used in all aspects of the game.

The user ID 802 is stored in the team database in association with the user state 804. The user state 804 defines whether the user is in a permitted state, i.e. has a chef's hat, or a locked state, i.e. does not have a chef's hat.

The user state 804 of a user changes from 'permitted to 'blocked' when the user loses his chef's hat, for example by losing a level. The user state 804 changes from 'blocked' to 'permitted' when users are released from the holder 112.

In some embodiments, users cannot select slices 104 when they are in a locked state. In other embodiments, users can select slices 104 when in a locked state, but no play button 310 is provided to the user on the pre-level display 300.

When a user selects, or attempts to select, a slice 104 of the cake, the team database 800 is accessed to determine whether the user is eligible to attempt the level.

Figure 7:
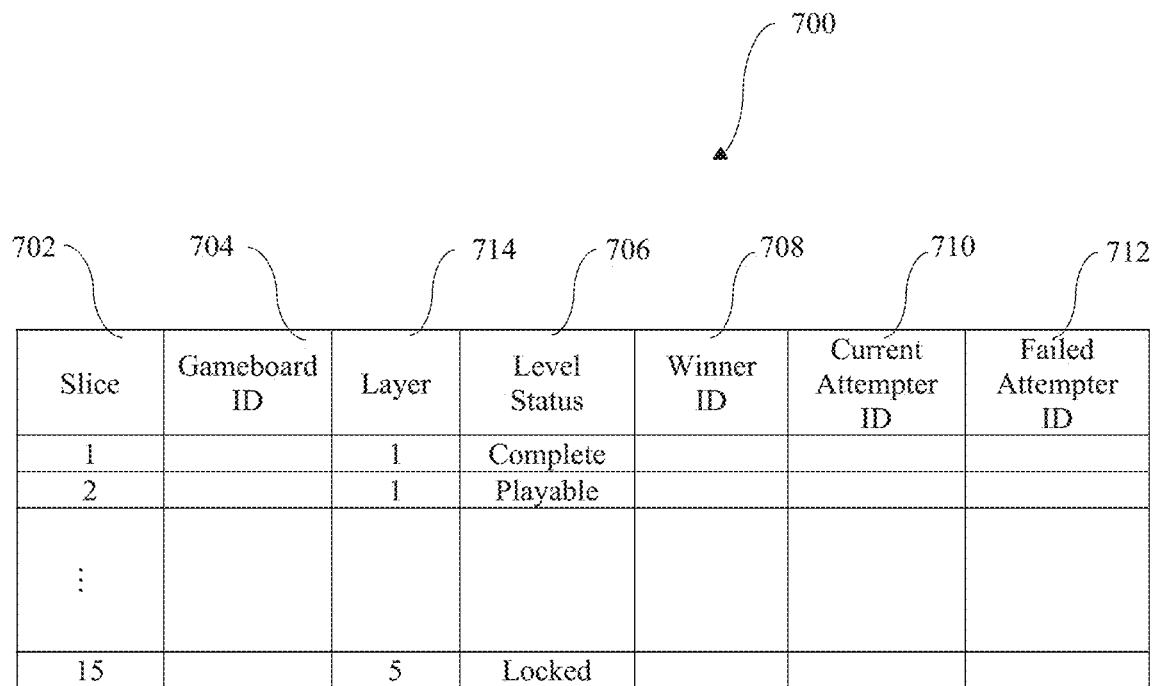
FIG. 7 is a schematic diagram of a progress database.

FIG. 7 shows an example progress database 700 corresponding to cake 100 as shown in FIG. 2. The progress database comprises seven fields: level 702, gameboard 704, layer 714, level status 706, winner ID 708, current attempter ID 710, and failed attempter ID 712.

The slice field 702 corresponds to the slices 104 of the cake 100. The gameboard ID is a unique identifier associated with the gameboard to be played if a particular slice 104 is selected. The layer 714 defines the layer of the cake 100 of the slice.

Each slice is associated with a level status 706, which defines if the level is 'complete', 'playable' or 'locked'. In the example of FIG. 7, slice 1 has a 'complete' status, level 2 a 'playable' status, and level 15 a 'locked' status, as discussed with reference to FIG. 2 above.

Once all of the levels with the same layer 714 have a completed level status 706, all of the levels of the next layer 714 are unlocked, such that the level status 706 of all of the slices 702 of the next layer 714 changes from 'locked' to 'playable'.

The winner ID 708, current attempter ID 710 and, failed attempter ID 712 fields correspond to the users who have completed, are currently playing, and have failed the level respectively. The user IDs 802 of the relevant users are stored in these fields. It will be appreciated that each field 708, 710, 712 may hold more than one user ID 802.

When a slice 104 is selected by a user on the progress view, the progress database 700 is accessed to determine how to render the pre-level display 300 and the gameboard (discussed below). The progress database 700 may also be used to render the progress view, for example for determining how to visually render each slice 104 of the cake 100.

The progress database 700 may be updated every time a user starts and finishes a level attempt. In this way, the user IDs 802 stored in the winner ID 708, current attempter ID 710 and failed attempter ID 712 fields is accurate. Alternatively, the progress database 700 may be updated periodically, at predefined time intervals.

If a user attempts a level while in an offline playing mode, the progress database 700 is updated with regards to that user's activities when the user's device enters an online playing mode.

The progress view of each user updates to visually represent the current data stored in the progress database 700 every time the progress databased 700 is updated, provided the user device is in the online mode and displaying the progress view. If the user device is offline, his progress view will update when the user device next enters the online mode which the progress view is being displayed.

Figure 9:
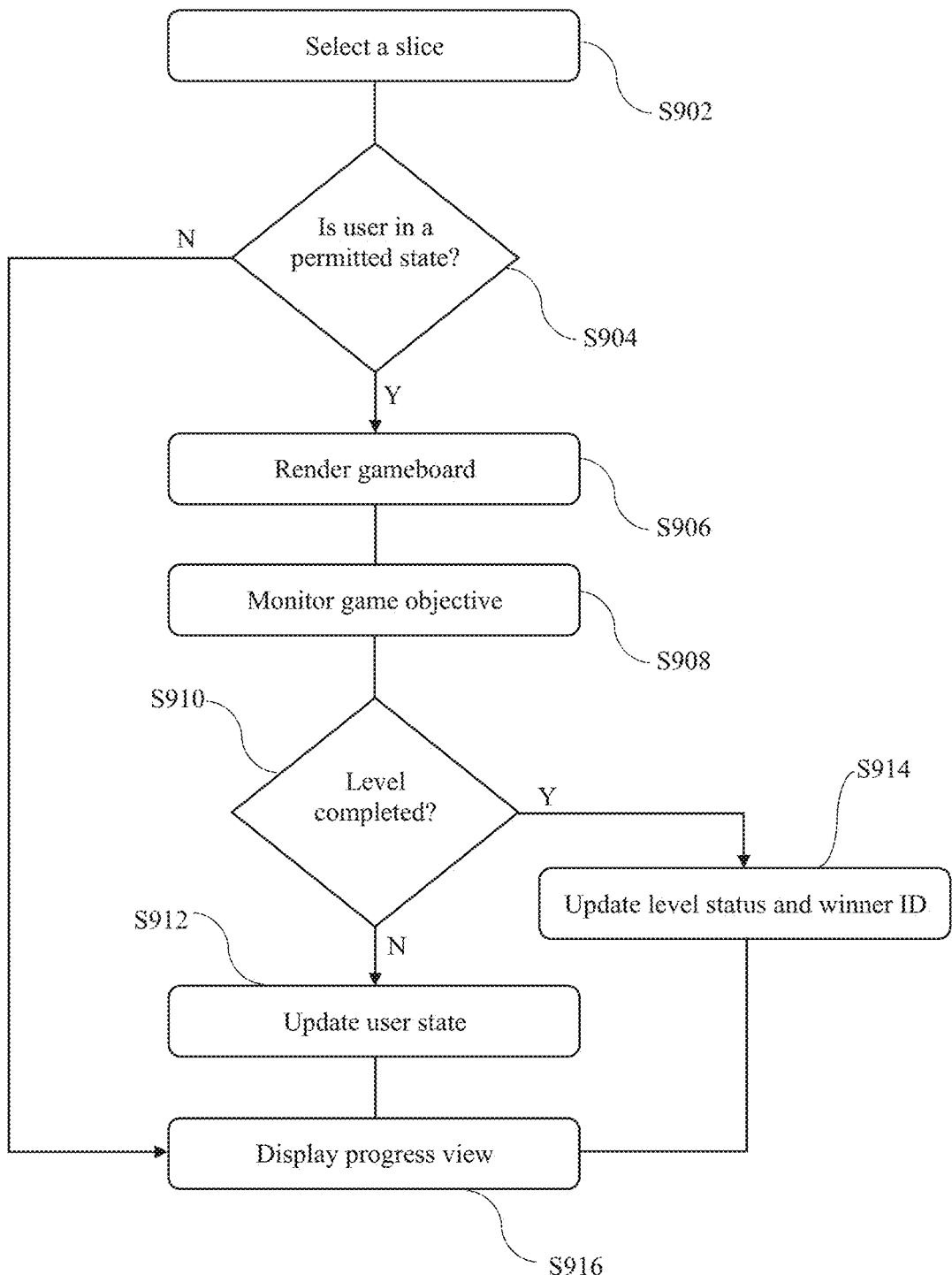
FIG. 9 is an example process for monitoring actions of a user and updating team progression.

FIG. 9 is an example process for monitoring actions of a user and updating the team progression. At step S902 the user selects a slice 104 of the cake 100. The user selects the slice 104 by providing a user input at the display of the user device at a location corresponding to the slice 104. In some embodiments, the level status is 706 is checked when the user selects a slice, and only proceeds to step S904 if the level has a 'playable' status. In other embodiments, the slice 104 is only selectable if the level status 706 is 'playable'.

At step S904, the user state 804 is determined. This may be determined locally on the user device or it may be determined by accessing a team database 800 stored on the server. If determined locally, the user state 804 may be determined from a locally stored version of the team database 800, or a current user state 804 of the user may be maintained on the user device which is used in the determination of step S904.

If the user is not in the permitted state, i.e. the user is in a blocked state, the progress view is rendered to the user, step S916. In some embodiments, the pre-level display 300 may be displayed to the user when he selects the slice but no play button 310 rendered. In other embodiments, there may no visual action taken, such that the blocked user is prevented from selecting the slice 104.

If, however, the user is in a permitted state, the gameboard associated with the selected slice 104 is rendered at step S906. The gameboard may be rendered by accessing the progress database 700 to determine the gameboard ID 704 associated with the selected slice 702. The gameboard ID 704 can be used to retrieve the gameboard. In some embodiments, the user device stores locally the gameboards associated with the playable layer 102a or the cake 100 such that the user can play while the user device is in an offline mode. When in an online mode, the gameboard can be retrieved from the server. Alternatively, the gameboards may be exclusively stored at the server such that the user may only be able to access the gameboards when the user device is in an online mode.

When the user begins to attempt a level, the user ID 802 is stored in the current attempter ID field 710 of the progress database 710, such that other users can see that the level is being attempted by the user.

At step S908, the user plays the gameboard in an attempt to achieve a game objective associated with the level within a given constraint, and the gameplay is monitored. The game objective may, for example, be to collect a predefined number of points, and the constraint may be the time in which the user has to complete achieve the game objective. Other examples of game objective and constraints are discussed below. The gameplay is monitored to determine if the game objective is attained within the constraint.

At step S910 it is determined if the user completed the level, that is attained the game objective within the constraint. Step S910 occurs when the level ends, which is either due to the user completing the level or the constraint limit being reach or exceeded.

If the user has successfully completed the level, the level status 706 and winner ID 708 are updated in the progress database 700 such that the level status 706 changes from 'playable' to 'complete' and the user ID 802 of the user is stored in the winner ID field 708. In some embodiments, the level status 706 and winner ID 708 are updated in a copy of the progress database 700 stored locally on the user device, and then the information transferred to the progress database 700 stored at the server when the user next returns to the progress view in the online mode. In other embodiments, the progress database 700 stored on the server is preferentially updated provided the user device is in the online mode. That is, the progress database 700 at the server is updated as soon as the information becomes available, that is as soon as it is determined that the user has completed the level. The user ID 802 stored in the winner ID field 708 may be referred to as a completion indication.

The progress view is then displayed to the user at step S916. The progress view is visually rendered to show the progress towards the common objective provided by the user. For example, the now completed slice 202 is rendered in a different colour and the user indicator of the user is rendered on the completed slice 202.

If, however, the user is unsuccessful in his attempt to complete the level, the user state 804 is updated, such that the user state 804 of the user changes from 'permitted' to 'blocked'. The user state 804 may first be updated locally, and then transferred to the centrally stored team database 800 when the user next returns to the progress view in the online mode. Alternatively, the team database 800 stored on the server may be preferentially updated when the user device is in the online mode.

The user ID 802 of the user is also added to the failed attempter ID field 712 of the progress database 700. A timestamp may be stored in association with the user ID 802 in the failed attempter ID field 712 so that a number of failed attempts by a single user can be determined.

When the progress database 700 is updated to include the user ID 802 in either the winner ID field 708 or the failed attempter ID field 712, the user ID 802 is removed from the current attempter ID field 710 since the user is no longer attempting the level.

Once the user state has been updated, the progress view is displayed on the user device, step S916. The user is no longer able to attempt any levels as the user state 804 is set to 'blocked'. The slice 104 attempted by the user continues to be rendered playable and the user indicator associated with the now blocked user is displayed in the holder 112. The user remains in the blocked state until the user is released by a teammate.

In some embodiment, a time associated with when the user completes a level is recorded. For example, the user ID 802 may be stored in the winner ID field 708 with a timestamp. The time can be used to determine which user of the team completed a level first and therefore how to display the user indicators on the progress view.

Data relating to the user's progress when playing the gameboard, for example, that the user has started an attempt, whether the user has competed or failed the attempt, and any related timestamps or other timing information, may be referred to as play data.

The centrally stored information, that is the progress database 700 and team database 800 stored at the server, is provided to the user devices of all team members, when in an online mode, such that each user device receives information relating to progress made towards completing the common objective at remote user devices associated with the other team members.

Figure 10:
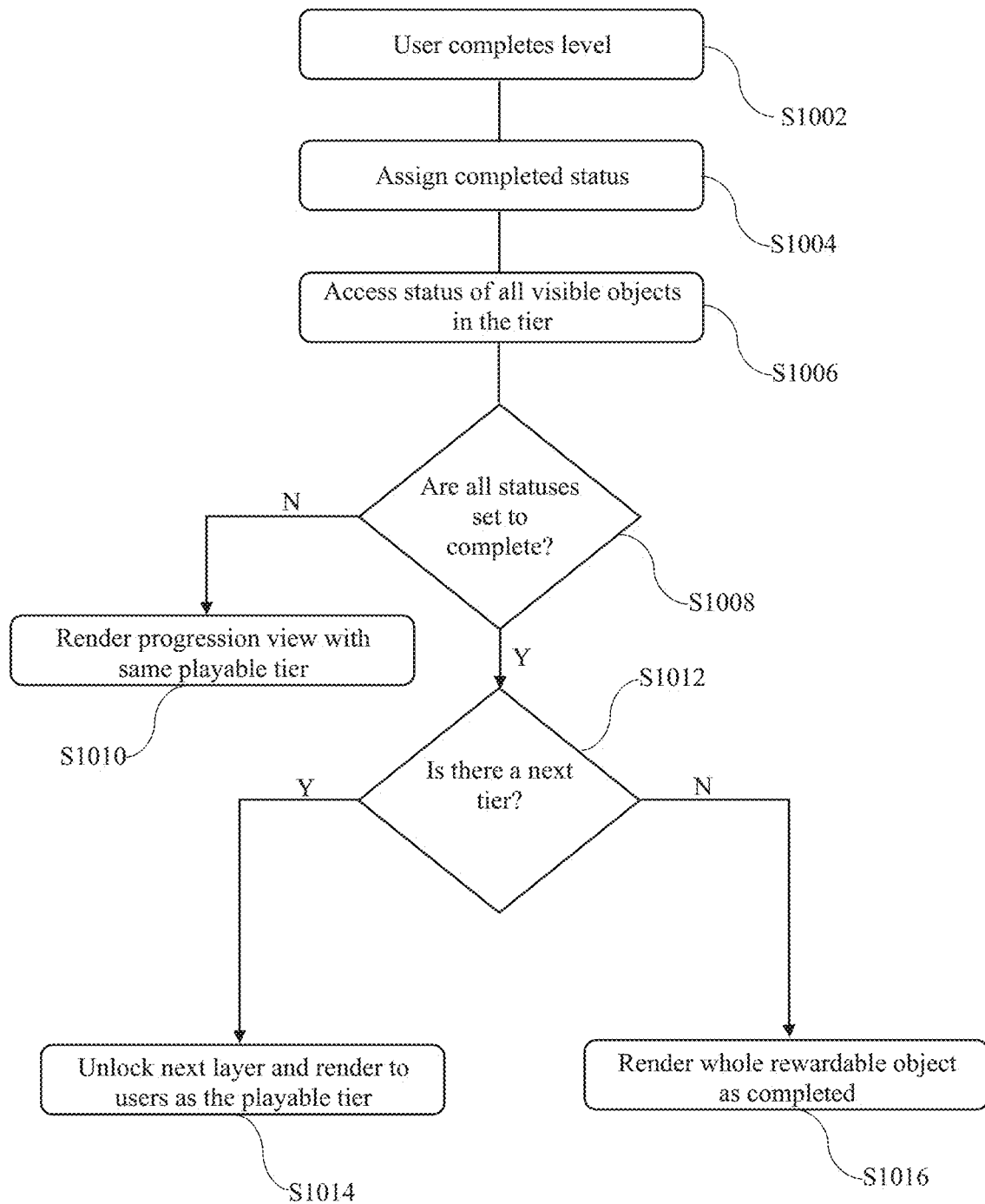
FIG. 10 is an example process for updating the progression view.

FIG. 10 is an example flow process for updating the progress view when a user completes a level.

At step S1002, the user attains the game objective of the level he is attempting, so completes the level.

In some embodiments, users are able to play completed levels. That is, users are not prevented from selecting or attempting completed levels. The associated visible object, in the above example the slice, is then assigned a completed status at step S1004. The slice may be assigned the completed status by changing the level status 706 from playable to complete, as discussed above with reference to FIG. 7. The level status 706 may first be updated in the progression database 700 stored locally on the user device and then updated in the centrally stored progression database 700 stored at the server. Alternatively, the centrally stored database 700 may be updated preferentially, if the user device is in the online mode.

It is then determined if all visual objects in the tier, e.g. slices in the layer, are completed. To do this, the statuses of all of the visible objects in the tier are accessed from the progression database 700 at step S1006. This may be the progress database 700 stored at the user device or that stored at the server. At step S1008, it is determined if all of these statuses are complete. This step may be performed by the server, or at the user device.

If it is determined that not all of the levels in the tier have been completed, that is at least one of the visual objects has a playable status, the progress view is rendered to the user with the same tier being the playable tier, step S1010.

However, if it is determined that all of the levels in the tier have been completed, it is determined at step S1012 whether there is a next tier in the whole rewardable object. This may be achieved by accessing the progress database 700, sorted either locally on the user device or centrally on the server, and determining if there are any visible objects with a locked status and/or associated with a layer which has a higher value than that of the level which has just been completed by the user. This determination step may occur at the server or locally at the user device.

If there is a next tier, it is unlocked such that the level status 706 of the visible objects of the tier is changed from locked to playable. The newly playable layer is then rendered to the user on the display so that the user can select one of the visible objects of the layer.

If, however, there is no next tier, the team have completed all of the levels of the whole rewardable object. The whole rewardable object is then rendered to the user as competed, step S1016. The team have successfully completed the common objective.

It will be appreciated that there may be one or more additional steps include in the process set out in FIG. 10. For example, the constraint within which the team are required to complete the common objective may be checked at one or more points in the process. For example, the constraint may be checked after the user completes the level, step S1002. If the constraint has not expired, the process proceeds to step S1004. However, if the constraint has expired, the level is not assigned a completed status and the user is informed that the constraint has expired. The user is then unable to select any further levels to attempt.

In some embodiments, messages are sent from the server to the remote user devices of the team members when the progress database 700 and/or team database 800 is updated, such that the progress view of each of the users is updated. That is, the information is pushed from the server to the user devices.

Alternatively, the progress view of each user updates, based on the information stored at the server, periodically or after the user completed a predefined action, e.g. completing a level, selecting a slice 102, etc. In this instance, the information may be pushed by the server or pulled by the user device.

It will be appreciated that layers and slices as discussed above may not be visualised differently depending on whether they are locked, playable, or complete. In some embodiments, each slice 104 of the cake 100 is visualised in the same way, but users are unable to select and play those corresponding to locked or, optionally, completed levels.

Figure 6:
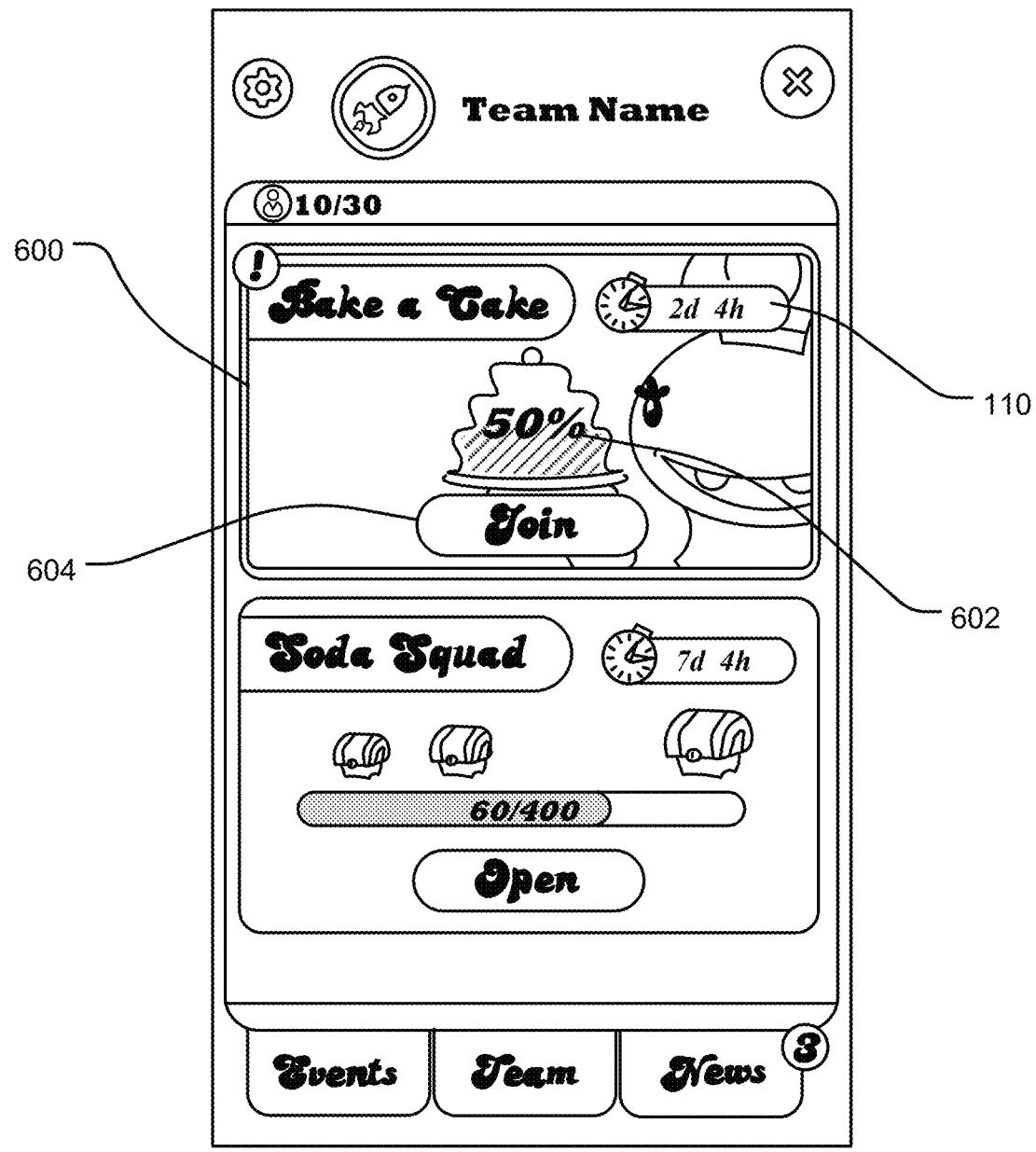
FIG. 6 is an example widget for accessing the collaborative game mode.

The game mode discussed above may be accessible to the user via a game mode widget 600 presented to the user on the user device when the device is operating within a game application, as shown in FIG. 6.

The game mode widget 600 is rendered on the display comprising a progression bar 602 and the countdown 110. The progression bar 602 provides a visual indication of the team's progression towards completing the common objective. The progression bar 602 in FIG. 6 indicates that 50% of the objective has been completed. That is 50% of the levels of the cake 100 have been completed by the team. The countdown 110 corresponds to the countdown 110 shown in the progression view.

If the user wishes to play in the game mode to try to contribute towards completing the common objective, the user selects the widget 600 or part of the widget 600. In FIG. 6, the game mode widget 600 is provided with a join button 604. When the user selects the join button 604, he enters the game mode and is presented with the progression view as defined by the current data stored in the progression database 700.

In some embodiments, there may be no user state 804. In such an embodiment, users are always able to play playable levels and users are not penalised within the progress view if they failing to complete a level when attempted. That is, users are not prevented from attempting further levels until released by a teammate. Instead, all team members can always contribute to the common objective.

Figure 14:
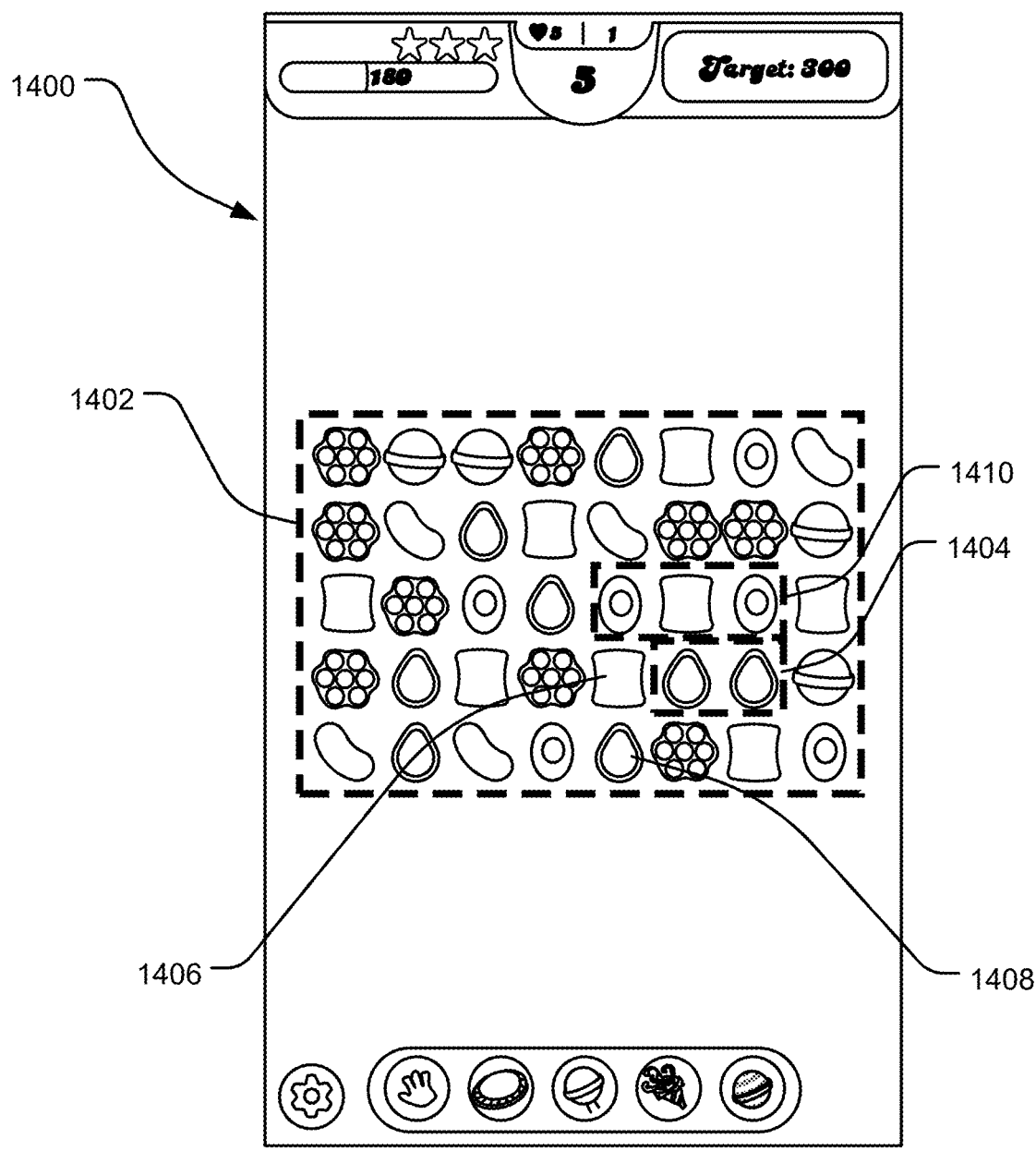
FIG. 14 shows a game play display of a switcher mechanic.

FIG. 14 shows an example of a game play display 1400 of a switcher game. A gameboard 1402 corresponding to grid 2500 is filled with blocks or objects of different shapes and colours. There is a pair of matching adjacent pear drops 1404. The user can select the square element 1406 and pear drop element 1408 in order to switch their respective tile locations on the gameboard 1402. In some embodiments, selection can be by clicking and moving each element. In other embodiments, the user can select the pear drop element 1408 and drag it towards the location of the square element 1406 in order to switch their respective tile locations. Once the dragged element is at a certain threshold distance of its 'switching' element (in this case square element 1406), the switch automatically occurs. This then creates a group of 3 matching adjacent pear drops which are subsequently removed from the gameboard 1402.

After the matching adjacent pear drops are removed, the tiles in which the now removed pear drop elements were located are rendered empty. The blocks occupying the tiles above the now empty tiles fall downwards to fill the empty tiles, as determined by refill physics. Refill physics determines the direction of movement of game elements on the gameboard. For example, the game elements in tile locations 1410 fall downwards to fill the tiles rendered empty after the removal of the matching pear drop elements. This is repeated up the gameboard until the only empty tiles are at the top of the gameboard. It will be appreciated that different tiles on the gameboard may be associated with different refill physics, such that replacement game elements move in different directions at different tile locations on the gameboard. This is described further in our previous U.S. application Ser. No. 14/183,997, filed Feb. 19, 2014, which is fully incorporated herein by reference. New blocks are spawned at the tile located at the top of these three columns, corresponding to the entry points of sets of tiles, as described later, so that refillable tiles on the gameboard 1402 are filled.

Whether the colour and/or shape characteristics of adjacent blocks match is determined by a match check. This check may be carried out for the whole gameboard 1402 where there are blocks. All blocks on the game board may be match checked against the blocks immediately adjacent to them, for example when controlling a cascade effect between player moves. For each player move, only the block(s) which experienced the user input and/or the blocks immediately adjacent to said block are match checked against the blocks immediately adjacent to them. When multiple blocks are detected to have matching characteristics, a group of blocks is formed such that even blocks which are not directly adjacent to each other are included in the same group as long as they are connected in an adjacent manner via other blocks which also possess the same matching characteristic. In some embodiments, these groups of matching adjacent blocks may have to all be connected in one direction, i.e. they may have to be either vertically or horizontally connected. The match check is implemented after the player selects the two blocks to switch tile locations.

The gameboard 1402 used in gameplay is defined by the tile grid 2500. A tile is rendered at a location and may support a block or have another quality e.g. a hole or blocker. Each tile has its own unique ID associated with it. Data about the game elements occupying each tile of the grid are stored in association with the name, or ID, of the tile. This data may be stored in, for example, a tile database. When blocks are removed from the tile grid 2500, tile refill occurs and the blocks located at the tiles affected by the refill process change. The data stored in the tile database is updated to represent the locations of elements on the grid 2500 after refill.

Figure 11:
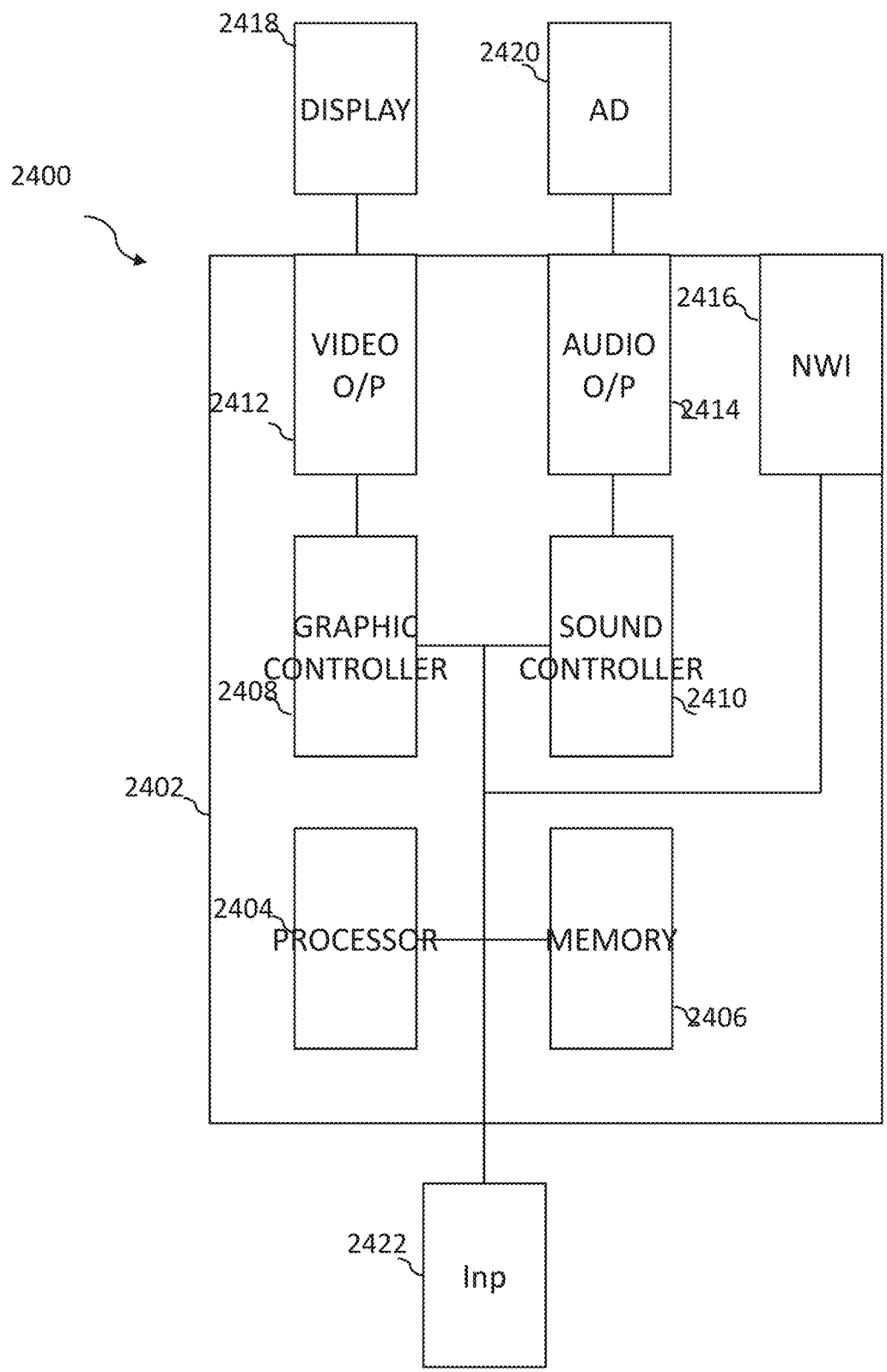
FIG. 11 is a schematic block diagram of a user device.

A schematic view of a user or computing device 2400 according to an embodiment is shown in FIG. 11. The user device has a controller 2402. The controller 2402 may have one or more processors 2404 and one or more memories 2406. For example, the data structures of FIGS. 7 and 8 may be held in memory 2406. The controller 2402 is also shown as having a graphics controller 2408 and a sound controller 2410. It should be appreciated that one or other or both of the graphics controller 2408 and sound controller 2410 may be provided by the one or more processors 2404. Other functional blocks may also be implemented by suitable circuitry or computer code executed by the one or more processor 2404.

The graphics controller 2408 is configured to provide a video output 2412. The sound controller 2410 is configured to provide an audio output 2414. The controller 2402 has a network interface 2416 allowing the device to be able to communicate with a network such as the Internet or other communication infrastructure.

The video output 2412 may be provided to a display 2418. The audio output 2414 may be provided to an audio device 2420 such as a speaker and/or earphones(s).

The device 2400 may have an input device 2422. The input device 2422 can take any suitable format such as one or more of a keyboard, mouse, touch screen, joystick or game controller. It should be appreciated that the display 2418 may in some embodiments also provide the input device 2422, for example, by way of an integrated touch screen.

The blocks of the controller 2402 are configured to communicate with each other via an interconnect such as a bus or any other suitable interconnect and/or by point to point communication.

It should be appreciated that, in some embodiments, the controller 2402 may be implemented by one or more circuits, at least in part.

It should be appreciated that embodiments may be deployed in different system architectures. For example, the computer game may be implemented as a computer game that is stored in the memory 2406 of the user device 2400. However, when online, a server 205 may handle some elements of the game in some embodiments. By way of example only, a Java game applet may be provided to the user device 2400 and the locally running Java applet will generate, for example, the graphics, sounds, and user interaction for the game play on the user device 2400. Java applet can have sufficient information to allow offline play when the user device is no longer in communication with the game server 205, e.g. if connectivity is lost.

In some embodiments, the game may be implemented as a computer program that is stored in a memory system, for example the server 205, and which runs on the processor of the game server. Data streams or updates are supplied to the user device 2400 to allow the user device 2400 to render and display graphics and sounds in a browser of the user device 2400.

Figure 12:
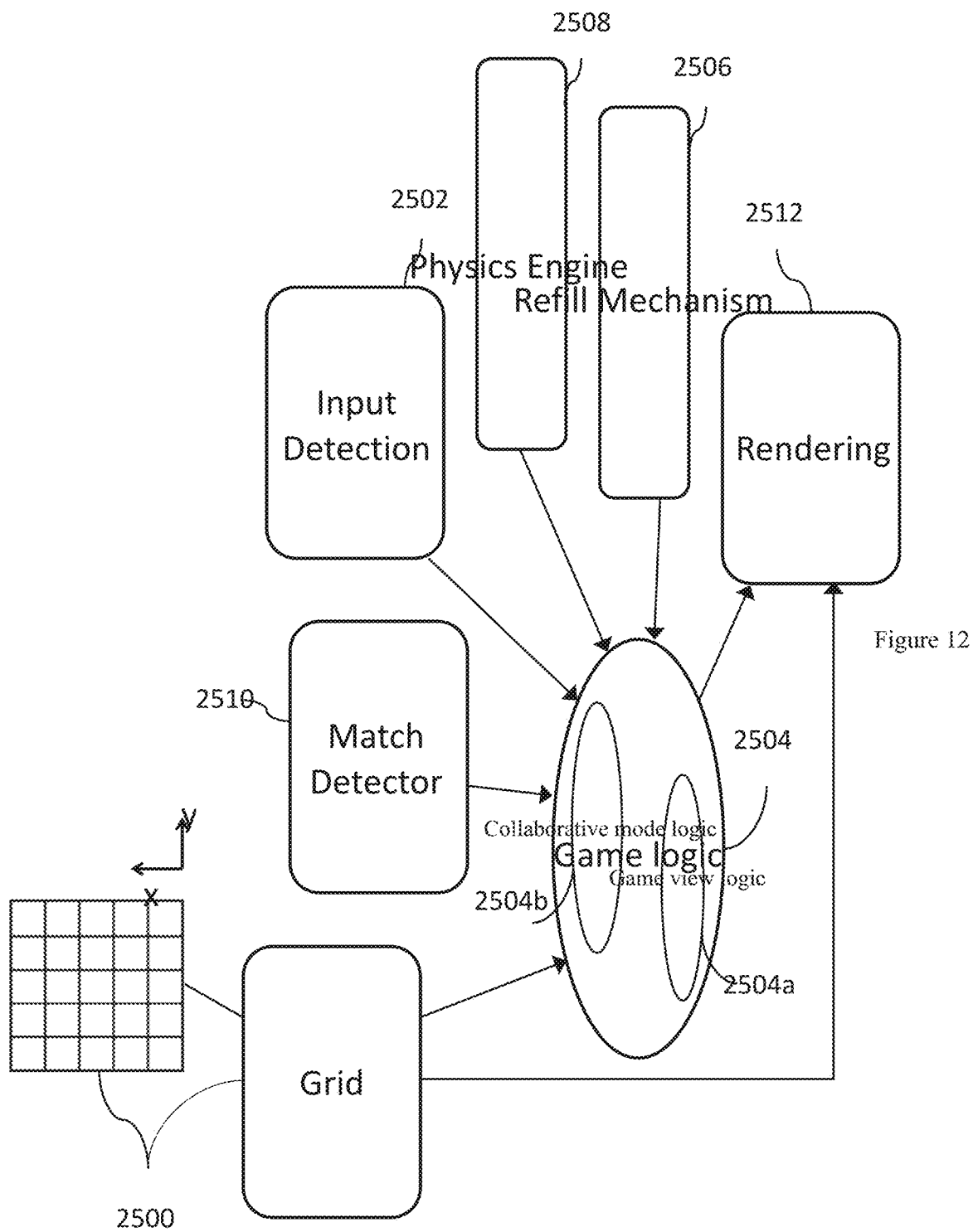
FIG. 12 shows a view of the functional components of the game.

FIG. 12 shows a schematic representation of the functional blocks of an embodiment of the present invention used to enable game play, such as that discussed above. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be removed and the element identifiers to be sent in a message to the opponent's device. In the context of the progression view, the user input can be used to select slices of the cake and enable release of team members from the holder. The game logic 2504 will process the information provided by the user input. The game logic 2504 may then determine if a valid selection has been made, and what the outcomes of the selection should be.

The game logic comprises game view logic 2504a, that is game logic associated with playing levels, and collaborative mode logic 2504b, that is logic associated with the progression view and the successes and failures of the team members.

The rendering block is used to render the game board 1402 to the user. It is also used to render the progression view. The rendering logic generates the visualisation of the cake and slices on the user display corresponding to the data stored in the progress database 700 and team database 800.

When one of the team members completes a level, the associated slice 104 updated such that it is rendered a completed slice 202. The collaboration view logic 2504b prevents the users interacting with completes slices 202 or slices 104 associated with locked layers 102b.

A grid component 2500 stored in a memory provides a grid representation of the game board as shown schematically in FIG. 12. The grid component can be supplied by any suitable data structure, held in a local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. the match detector component 2510, and the refill mechanism component 2506.

Each game element has object data associated therewith. The object data may be stored in any suitable memory location. In some embodiments, the object data may be provided by a data structure. In some embodiments, the object data may be considered to be part of the game logic and in other embodiments may be considered to be outside the game logic. The object data may provide information as to the properties of a game element or block. These properties can include attribute information such as colour and/or whether or not a game element has a particular function such as a booster function.

The game logic 2504 will determine the blocks selected by a user, and the actions to follow to implement the game mechanic.

Thus, the game logic controls the rules for determining if a valid group has been selected. The game logic will have access to data for each tile including its tile ID designating its location on the grid 2500, and associated tile data providing information about the contents of that tile, e.g. the game element within that tile or at least one characteristic associated with the game element within the tile. The game logic will thus be able to determine the game elements to be removed from those respective tiles for each user selection. The grid can be considered as a map which may be used to determining the relative positions of tiles on the game board from the tile ID. In embodiments of the present invention, the grid 2500 is implemented as a two-dimensional grid. By splitting the grid 2500 into row or column sets of tiles, each with their own deterministic game element generating algorithm, the game board may be simplified to a set of one-dimensional sub-grids. The grid 2500 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns. The position of a game element may be either where the game element is or where the game element is going (e.g. the endpoint of a game element moving due to a refill).

Once a group of blocks has been successfully selected, these blocks may be removed and the respective tiles will become empty. At this stage, a refill of the empty tiles is required based on the refill mechanism 2506. The refill mechanism may also have conditions on which it relies. For example, other moves or actions taking place on the game board may have to be completed before the refill mechanism can take place.

Each tile of the grid 2500 may be associated with data to indicate a status such as filled or unfilled (empty). Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular blocks. This may be as the endpoint of a block which is already in the game board and moving as a result of a game move due to the action of the physics engine 2508, or as the endpoint of a new block entering the game board. The physics engine component 2508 is configured to control the movement of moving game elements in the display. The physics engine 2508 may be part of the game logic 2504.

A filled tile will be treated by the game logic as a solid entity, preventing any other game objects from passing through this particular tile. By filled tile it is meant that the tile is occupied by a game element, e.g. a block, a booster etc. In this way, the game logic may also force the refill mechanism to conform to certain refill trajectories or paths. That is to say new or moving game elements will not be able to pass through or refill through filled tiles. It should be appreciated that the terms pass through and refill through are dependent on the specific game rules, e.g. some game boards may refill from a direction perpendicular to the plane of the game board.

It will be appreciated that, whilst specific embodiments of the invention have been described, these are not exhaustive. The scope of the invention is not defined by the described embodiment but only by the appendant claims.

The invention claimed is:

1. A computer device comprising:
  a user interface comprising a display and configured to receive from a first user a user input to engage with one or more visual object rendered on the display;
  one or more processor configured to operate in a social collaboration mode in which a team of users, including the first user, engage with respective remote user devices to attain a common objective to:
  render on the display a set of visual objects of a whole rewardable object, each visual object representing a respective game level having an associated game objective, wherein each visual object has stored in a progress database an associated respective level identifier, at least some of the visual objects having a playable status which defines that the visual object is available for play by users in the team excepting any of the users in a blocked state;
  detect a user input from the first user attempting to select one of the visual objects which has a playable status, determine that a user state of the first user is a blocked state, wherein the blocked state indicates that the first user is to be prevented from accessing a visual object having a playable status, and prevent access by the first user to the selected one of the visual objects;
  render a progress view on the user interface based on the progress database, the progress view including a completed status assigned to the selected one of the visual objects, the completed status defining that the visual object has been the subject of a successful attempt by any user of the team, except the first user, at their respective remote user devices to attain the game objective of the game level associated with the visual object.

2. The computer device according to claim 1, configured to monitor an attempt made by the first user to attain the associated game objective during play of the gameboard by the user, prior to the first user being assigned the blocked state.

3. The computer device according to claim 1, wherein the whole rewardable object comprises a plurality of tiers, wherein the set of visual objects are in a first tier and wherein the device is configured to render a second tier, when all visual objects of the first tier have been assigned a completed status, by changing an object status of a set of visual objects of the second tier from a locked status to the playable status, wherein the locked status defines that the visual object is not available for play.

4. The computer device according to claim 1, configured to detect an unsuccessful attempt by the first user to attain the associated game objective of the game level and assign the blocked state to the first user to prevent the first user from accessing further visual objects.

5. The computer device according to claim 4, wherein an unsuccessful attempt is an attempt by the first user which fails to attain the associated game objective within a predefined associated game constraint.

6. The computer device according to claim 1, configured to detect that one or more release conditions are satisfied and to change a user state associated with the first user from the blocked state to a permitted state, in which the user is able to access further visual objects to attempt further game levels.

7. The computer device according to claim 6, wherein the one or more release conditions comprises receipt on behalf of at least one user of the team of a release payment.

8. The computer device according to claim 6, configured to render a visual representation of each user of the team with an indication of the respective user state associated with each user.

9. The computer device according to claim 1, configured to render a visual indication of the blocked state, the visual indication of the blocked state being a selectable object which, when selected, renders a visual representation of the user associated with the blocked state.

10. The computer device according to claim 3, wherein the respective game levels associated with the visual objects of each tier have a similar degree of difficulty.

11. The computer device according to claim 3, configured to render the whole rewardable object on the display when each visual object of every tier comprising the whole rewardable object has a completed status.

12. The computer device according to claim 1, configured to render a visual representation of the user of the team which attained the associated game objective of the associated level.

13. The computer device according to claim 1, wherein the game environment comprises a gameboard having user selectable game elements.

14. A computer device connectable via a computer network to each of first and second user devices, each user device having a user interface comprising a display and configured to receive a user input to engage with one or more visual objects rendered on the display, the computer device comprising one or more processors configured to operate in a social collaboration mode to:
  generate for display at each of the first and second user devices a set of visual objects of a whole rewardable object, each visual object representing a respective game level of a set of game levels and having a respective level identifier and selectable by a user in a permitted state to access a gameboard having user selectable game elements playable in accordance with the respective game level to attain a respective game objective;
  detect a user input from a first user at the first device attempting to select one of the visual objects which has a playable status which defines that the visual object is available for play by users in the team excepting any of the users in a blocked state, determine that a user state of the first user is a blocked state, wherein the blocked state indicates that the first user is to be prevented from accessing a visual object having a playable status, and prevent access by the first user to the selected one of the visual objects;

receive play data from the second user device, the play data from the second user device comprising a completion indication of the game level when a successful attempt has been made at the second user device to attain the game objective of the respective game level of the selected visual object; and transmit the completion indication to the first user device to cause the first user device to change a status of the selected visual object displayed at the first user device from the playable status to a completed status.

15. The computer device according to claim 14, configured to monitor an attempt made by the first user to attain the associated game objective during play of the gameboard by the user, prior to the first user being assigned the blocked state.

16. The computer device according to claim 14, configured to detect an unsuccessful attempt by the first user to attain the associated game objective of the game level and assign the blocked state to the first user to prevent the first user from accessing further visual objects.

17. The computer device according to claim 16, wherein an unsuccessful attempt is an attempt by the first user which fails to attain the associated game objective within a predefined associated game constraint.

18. The computer device according to claim 14, configured to detect that one or more release conditions are satisfied and to change a user state associated with the first user from the blocked state to a permitted state, in which the user is able to access further visual objects to attempt further game levels.

19. The computer device according to claim 18, wherein the one or more release conditions comprises receipt from the first user or another user of the team of a release payment.

20. A method of controlling a computer device in a social collaboration mode in which a team of users, including the first user, engage with respective remote user devices to attain a common objective, the method comprising:

rendering on the display a set of visual objects of a whole rewardable object, each visual object representing a respective game level having an associated game objective, wherein each visual object has stored in a progress database an associated respective level identifier, at least some of the visual objects having a playable status which defines that the visual object is available for play by users in the team excepting any of the users in a blocked state;

detecting a user input from the first user attempting to select one of the visual objects which has a playable status, determining that a user state of the first user is a blocked state, wherein the blocked state indicates that the first user is to be prevented from accessing a visual object having a playable status, and preventing access by the first user to the selected one of the visual objects;

rendering a progress view on the user interface based on the progress database, the progress view including a completed status assigned to the selected one of the visual objects, the completed status defining that the visual object has been the subject of a successful attempt by any user of the team, except the first user, at their respective remote user devices to attain the game objective of the game level associated with the visual object.

\* \* \* \* \*